(12) United States Patent
Graves et al.

(10) Patent No.: US 8,706,630 B2
(45) Date of Patent: Apr. 22, 2014

(54) SYSTEM AND METHOD FOR SECURELY AUTHORIZING AND DISTRIBUTING STORED-VALUE CARD DATA

(75) Inventors: Phillip Craig Graves, Atlanta, GA (US); Merrill Brooks Smith, Atlanta, GA (US)

(73) Assignee: e2interactive, Inc., Atlanta, GA (US)

( * ) Notice: Subject to any disclaimer, the term of this patent is extended or adjusted under 35 U.S.C. 154(b) by 598 days.

(21) Appl. No.: 10/655,828

(22) Filed: Sep. 5, 2003

(65) Prior Publication Data

US 2005/0051619 A1 Mar. 10, 2005

Related U.S. Application Data

(63) Continuation-in-part of application No. 10/411,971, filed on Apr. 11, 2003, now Pat. No. 7,083,084, which is a continuation of application No. 09/641,363, filed on Aug. 18, 2000, now Pat. No. 6,575,361.

(60) Provisional application No. 60/149,740, filed on Aug. 19, 1999.

(51) Int. Cl.
*G06Q 40/00* (2012.01)
(52) U.S. Cl.
USPC ............... 705/44; 705/35; 705/37; 705/38; 705/39; 705/40; 235/375; 235/379; 235/380; 235/381; 235/382; 235/385
(58) Field of Classification Search
USPC ............................... 705/35–44; 235/375–385
See application file for complete search history.

(56) References Cited

U.S. PATENT DOCUMENTS

| 3,553,440 A | 1/1971 | Dale |
| 3,958,103 A | 5/1976 | Oka et al. |

(Continued)

FOREIGN PATENT DOCUMENTS

| DE | 19641776 | 3/1997 |
| EP | 0406841 | 7/1990 |

(Continued)

OTHER PUBLICATIONS

ISA/European Patent Office, "Notification of Transmittal of the International Search Report and the Written Opinion of the International Searching Authority, or the Declaration", mailed in related PCT/US2004/029426 on Jan. 20, 2005, 12 pages.

(Continued)

*Primary Examiner* — Narayanswamy Subramanian
(74) *Attorney, Agent, or Firm* — Landmark Intellectual Property Law, PC

(57) ABSTRACT

A computerized system and method for securely authorizing and distributing stored-value card data over a communications network is provided. The method allows for storing in the database a plurality of records comprising stored-value card data for each stored-value card as well as information identifying a plurality of trusted sources of stored-value card activation requests and/or a plurality of trusted communications networks for transmitting stored-value card activation requests. A transmitting step allows for a requesting terminal to transmit over a communications network a request to change the status of a stored-value card. The central processor then determines whether the requesting terminal and/or the communications network is a trusted source. Based on whether the requesting terminal or communications network is a trusted source or trusted communications network, the request can be processed and the card can be activated. A method for establishing a list of trusted sources and trusted communications networks is also provided.

20 Claims, 10 Drawing Sheets

(56) References Cited

U.S. PATENT DOCUMENTS

| | | | | |
|---|---|---|---|---|
| 4,068,213 | A | 1/1978 | Nakamura | |
| 4,317,957 | A | 3/1982 | Sendrow | |
| 4,482,802 | A | 11/1984 | Aizawa | |
| 4,734,858 | A | 3/1988 | Schlafly | |
| 4,747,049 | A | 5/1988 | Richardson | |
| 4,755,940 | A | 7/1988 | Brachtl | |
| 4,767,917 | A | 8/1988 | Ushikubo | |
| 4,795,892 | A | 1/1989 | Gilmore | |
| 4,877,947 | A | 10/1989 | Mori | |
| 4,900,904 | A | 2/1990 | Wright | |
| 4,908,521 | A | 3/1990 | Boggan | |
| 4,943,707 | A | 7/1990 | Boggan | |
| 5,117,355 | A | 5/1992 | Mccarthy | |
| 5,202,826 | A | 4/1993 | Mccarthy | |
| 5,255,182 | A | 10/1993 | Adams | |
| 5,274,845 | A * | 12/1993 | Wang | 455/461 |
| 5,309,506 | A | 5/1994 | Alexander | |
| 5,365,046 | A | 11/1994 | Haymann | |
| 5,383,113 | A | 1/1995 | Kight et al. | |
| 5,384,449 | A | 1/1995 | Peirce | |
| 5,386,455 | A | 1/1995 | Cooper | |
| 5,465,206 | A | 11/1995 | Hilt et al. | |
| 5,465,288 | A | 11/1995 | Falvey et al. | |
| 5,477,038 | A | 12/1995 | Levine | |
| 5,500,513 | A * | 3/1996 | Langhans et al. | 235/380 |
| 5,502,765 | A | 3/1996 | Ishiguro | |
| 5,511,114 | A | 4/1996 | Stimson | |
| 5,524,073 | A | 6/1996 | Stambler | |
| 5,577,109 | A | 11/1996 | Stimson | |
| 5,578,808 | A | 11/1996 | Taylor | |
| 5,621,201 | A | 4/1997 | Langhans | |
| 5,621,787 | A | 4/1997 | McKoy | |
| 5,644,721 | A | 7/1997 | Chung et al. | |
| 5,657,389 | A | 8/1997 | Houvener | |
| 5,673,309 | A | 9/1997 | Woynoski | |
| 5,679,938 | A | 10/1997 | Templeton | |
| 5,679,940 | A | 10/1997 | Templeton | |
| 5,684,291 | A | 11/1997 | Taskett | |
| 5,696,908 | A | 12/1997 | Muehlberger et al. | |
| 5,696,909 | A | 12/1997 | Wallner | |
| 5,705,798 | A | 1/1998 | Tarbox | |
| 5,721,768 | A | 2/1998 | Stimson et al. | |
| 5,721,781 | A | 2/1998 | Deo | |
| 5,732,136 | A | 3/1998 | Murphree | |
| 5,740,160 | A * | 4/1998 | Ikegami et al. | 370/255 |
| 5,754,655 | A | 5/1998 | Hughes et al. | |
| 5,760,381 | A | 6/1998 | Stich | |
| 5,777,305 | A * | 7/1998 | Smith et al. | 235/380 |
| 5,777,565 | A | 7/1998 | Hayashi et al. | |
| 5,806,045 | A | 9/1998 | Biorge et al. | |
| 5,812,668 | A | 9/1998 | Weber | |
| 5,815,561 | A | 9/1998 | Nguyen | |
| 5,828,740 | A | 10/1998 | Khuc | |
| 5,844,972 | A | 12/1998 | Jagadish | |
| 5,850,599 | A | 12/1998 | Seiderman | |
| 5,868,236 | A | 2/1999 | Rademacher | |
| 5,870,724 | A | 2/1999 | Lawlor et al. | |
| 5,873,072 | A | 2/1999 | Kight et al. | |
| 5,887,253 | A | 3/1999 | O'Neil et al. | |
| 5,889,863 | A | 3/1999 | Weber | |
| 5,903,633 | A * | 5/1999 | Lorsch | 379/114.2 |
| 5,903,830 | A * | 5/1999 | Joao et al. | 455/406 |
| 5,903,874 | A | 5/1999 | Leonard et al. | |
| 5,903,878 | A | 5/1999 | Talati et al. | |
| 5,909,492 | A | 6/1999 | Payne et al. | |
| 5,918,909 | A | 7/1999 | Fiala | |
| 5,930,363 | A | 7/1999 | Stanford | |
| 5,945,653 | A | 8/1999 | Walker | |
| 5,955,951 | A | 9/1999 | Wischerop et al. | |
| 5,956,636 | A | 9/1999 | Lipsit | |
| 5,956,695 | A | 9/1999 | Carrithers | |
| 5,956,700 | A | 9/1999 | Landry | |
| 5,974,311 | A | 10/1999 | Lipsit | |
| RE36,365 | E | 11/1999 | Levine | |
| 5,987,132 | A | 11/1999 | Rowney | |
| 5,991,413 | A | 11/1999 | Arditti et al. | |
| 5,991,748 | A | 11/1999 | Taskett | |
| 5,991,749 | A | 11/1999 | Morrill, Jr. | |
| 5,991,750 | A * | 11/1999 | Watson | 705/44 |
| 5,999,624 | A | 12/1999 | Hopkins | |
| 6,000,608 | A * | 12/1999 | Dorf | 235/380 |
| 6,003,014 | A | 12/1999 | Lee | |
| 6,011,287 | A | 1/2000 | Itoh et al. | |
| 6,012,049 | A | 1/2000 | Kawan | |
| 6,016,480 | A | 1/2000 | Houvener | |
| 6,018,570 | A | 1/2000 | Matison | |
| 6,018,717 | A | 1/2000 | Lee et al. | |
| 6,029,151 | A | 2/2000 | Nikander | |
| 6,032,133 | A | 2/2000 | Hilt et al. | |
| 6,032,135 | A | 2/2000 | Molano | |
| 6,032,859 | A | 3/2000 | Muehlberger | |
| 6,038,549 | A | 3/2000 | Davis | |
| 6,047,270 | A | 4/2000 | Joao et al. | |
| 6,056,289 | A | 5/2000 | Clapper, Jr. | |
| 6,058,300 | A | 5/2000 | Hanson | |
| 6,058,382 | A | 5/2000 | Kasai et al. | |
| 6,062,472 | A | 5/2000 | Cheung | |
| 6,072,870 | A | 6/2000 | Nguyen | |
| 6,073,842 | A | 6/2000 | Yoshinaga | |
| 6,088,682 | A | 7/2000 | Burke | |
| 6,092,053 | A | 7/2000 | Boesch et al. | |
| 6,094,643 | A | 7/2000 | Anderson | |
| 6,098,053 | A | 8/2000 | Slater | |
| 6,105,008 | A | 8/2000 | Davis | |
| 6,108,642 | A | 8/2000 | Findley | |
| 6,119,096 | A | 9/2000 | Mann et al. | |
| 6,119,105 | A | 9/2000 | Williams | |
| 6,119,106 | A | 9/2000 | Mersky et al. | |
| 6,119,946 | A | 9/2000 | Teicher | |
| 6,124,799 | A | 9/2000 | Parker | |
| 6,129,275 | A | 10/2000 | Urquhart et al. | |
| 6,129,276 | A | 10/2000 | Jelen et al. | |
| 6,138,106 | A | 10/2000 | Walker et al. | |
| 6,142,369 | A | 11/2000 | Jonstromer | |
| 6,163,843 | A | 12/2000 | Inoue | |
| 6,167,387 | A | 12/2000 | Lee-Wai-Yin | |
| 6,169,890 | B1 | 1/2001 | Vatanen | |
| 6,169,975 | B1 | 1/2001 | White | |
| 6,169,976 | B1 | 1/2001 | Colosso | |
| 6,173,272 | B1 * | 1/2001 | Thomas et al. | 705/42 |
| 6,175,823 | B1 | 1/2001 | Van Dusen | |
| 6,182,894 | B1 | 2/2001 | Hackett et al. | |
| 6,185,545 | B1 | 2/2001 | Resnick | |
| 6,188,752 | B1 | 2/2001 | Lesley | |
| 6,189,787 | B1 | 2/2001 | Dorf | |
| 6,190,256 | B1 | 2/2001 | Walker | |
| 6,202,933 | B1 | 3/2001 | Poore | |
| 6,208,851 | B1 | 3/2001 | Hanson | |
| RE37,122 | E | 4/2001 | Levine | |
| 6,215,999 | B1 * | 4/2001 | Dorenbosch | 455/434 |
| 6,220,511 | B1 | 4/2001 | Holec | |
| 6,226,364 | B1 | 5/2001 | O'Neil | |
| 6,226,624 | B1 | 5/2001 | Watson | |
| 6,230,145 | B1 | 5/2001 | Verderamo | |
| 6,237,023 | B1 | 5/2001 | Yoshimoto | |
| 6,240,397 | B1 | 5/2001 | Sachs | |
| 6,253,027 | B1 | 6/2001 | Weber | |
| 6,256,690 | B1 | 7/2001 | Carper | |
| 6,270,012 | B1 | 8/2001 | Dawson | |
| 6,282,566 | B1 | 8/2001 | Lee, Jr. | |
| 6,285,749 | B1 | 9/2001 | Manto | |
| 6,289,010 | B1 | 9/2001 | Voit | |
| 6,295,522 | B1 * | 9/2001 | Boesch | 705/41 |
| 6,298,336 | B1 | 10/2001 | Davis | |
| 6,302,326 | B1 | 10/2001 | Symonds | |
| 6,304,915 | B1 | 10/2001 | Nguyen | |
| 6,308,887 | B1 | 10/2001 | Korman | |
| 6,311,165 | B1 | 10/2001 | Coutts et al. | |
| 6,311,170 | B1 | 10/2001 | Embrey | |
| 6,314,171 | B1 | 11/2001 | Dowens | |
| 6,314,520 | B1 * | 11/2001 | Schell et al. | 726/13 |
| 6,315,195 | B1 * | 11/2001 | Ramachandran | 235/380 |
| 6,315,206 | B1 | 11/2001 | Hansen | |
| 6,324,525 | B1 | 11/2001 | Kramer | |

(56) References Cited

U.S. PATENT DOCUMENTS

| | | | |
|---|---|---|---|
| 6,328,341 B2 | 12/2001 | Klure | |
| 6,330,544 B1 | 12/2001 | Walker et al. | |
| 6,330,976 B1 | 12/2001 | Dymetman et al. | |
| 6,332,135 B1 | 12/2001 | Conklin | |
| 6,333,976 B2 | 12/2001 | Lesley | |
| 6,351,810 B2 * | 2/2002 | Gupta | 713/2 |
| 6,363,362 B1 | 3/2002 | Burfield et al. | |
| 6,366,893 B2 | 4/2002 | Hannula et al. | |
| 6,375,073 B1 | 4/2002 | Aebi | |
| 6,381,631 B1 * | 4/2002 | van Hoff | 709/202 |
| 6,386,457 B1 | 5/2002 | Sorie | |
| 6,397,196 B1 | 5/2002 | Kravetz et al. | |
| 6,422,462 B1 | 7/2002 | Cohen | |
| 6,424,706 B1 | 7/2002 | Katz | |
| 6,434,238 B1 | 8/2002 | Chaum | |
| 6,434,379 B1 | 8/2002 | Despres | |
| 6,442,532 B1 | 8/2002 | Kawan | |
| 6,445,780 B1 | 9/2002 | Rosset | |
| 6,453,035 B1 * | 9/2002 | Psarras et al. | 379/221.08 |
| 6,454,165 B1 | 9/2002 | Dawson | |
| 6,467,684 B2 | 10/2002 | Fite et al. | |
| 6,473,500 B1 | 10/2002 | Risafi | |
| 6,478,401 B1 | 11/2002 | King et al. | |
| 6,490,445 B1 | 12/2002 | Holmes | |
| 6,494,367 B1 | 12/2002 | Zacharias | |
| 6,494,637 B2 | 12/2002 | Huber | |
| 6,502,745 B1 | 1/2003 | Stimson | |
| 6,504,757 B1 | 1/2003 | Hollmer et al. | |
| 6,507,644 B1 | 1/2003 | Henderson | |
| 6,516,417 B1 * | 2/2003 | Pegrum et al. | 726/15 |
| 6,525,953 B1 | 2/2003 | Johnson | |
| 6,529,593 B2 | 3/2003 | Nelson | |
| 6,529,880 B1 | 3/2003 | McKeen et al. | |
| 6,549,770 B1 | 4/2003 | Marran | |
| 6,575,361 B1 | 6/2003 | Graves et al. | |
| 6,581,827 B2 | 6/2003 | Welton | |
| 6,582,827 B1 | 6/2003 | Im | |
| 6,588,658 B1 | 7/2003 | Blank | |
| 6,591,098 B1 | 7/2003 | Shieh et al. | |
| 6,592,035 B2 | 7/2003 | Mandile | |
| 6,594,640 B1 | 7/2003 | Postrel | |
| 6,609,113 B1 | 8/2003 | O'Leary et al. | |
| 6,612,487 B2 | 9/2003 | Tidball et al. | |
| 6,615,189 B1 | 9/2003 | Phillips et al. | |
| 6,615,190 B1 | 9/2003 | Slater | |
| 6,618,366 B1 * | 9/2003 | Furukawa et al. | 370/338 |
| 6,622,015 B1 | 9/2003 | Himmel et al. | |
| 6,625,438 B2 | 9/2003 | Hanson | |
| 6,636,489 B1 | 10/2003 | Fingerhut | |
| 6,643,503 B1 | 11/2003 | Phillips | |
| 6,643,504 B1 | 11/2003 | Chow et al. | |
| 6,648,222 B2 | 11/2003 | McDonald | |
| 6,651,885 B1 | 11/2003 | Arias | |
| 6,659,259 B2 | 12/2003 | Knox et al. | |
| 6,675,153 B1 | 1/2004 | Cook et al. | |
| 6,678,664 B1 | 1/2004 | Ganesan | |
| 6,684,269 B2 | 1/2004 | Wagner | |
| 6,714,918 B2 | 3/2004 | Hillmer | |
| 6,745,022 B2 | 6/2004 | Knox | |
| 6,754,636 B1 | 6/2004 | Walker et al. | |
| 6,785,537 B2 | 8/2004 | Hicks | |
| 6,805,289 B2 | 10/2004 | Noriega et al. | |
| 6,820,802 B2 | 11/2004 | Biggar et al. | |
| 6,827,260 B2 | 12/2004 | Stoutenburg et al. | |
| 6,829,596 B1 | 12/2004 | Frazee | |
| 6,836,765 B1 | 12/2004 | Sussman | |
| 6,836,962 B2 | 1/2005 | Khandros et al. | |
| 6,837,426 B2 | 1/2005 | Tidball et al. | |
| 6,839,744 B1 | 1/2005 | Kloba et al. | |
| 6,848,613 B2 | 2/2005 | Nielsen et al. | |
| 6,868,391 B1 | 3/2005 | Hultgren | |
| 6,882,984 B1 | 4/2005 | Boyle | |
| 6,886,742 B2 | 5/2005 | Stoutenburg et al. | |
| 6,918,537 B2 | 7/2005 | Graves | |
| 6,925,439 B1 | 8/2005 | Pitroda | |
| 6,932,268 B1 | 8/2005 | Mccoy et al. | |
| 6,934,529 B2 | 8/2005 | Bagoren et al. | |
| 6,934,689 B1 | 8/2005 | Ritter et al. | |
| 6,941,270 B1 | 9/2005 | Hannula | |
| 6,948,065 B2 | 9/2005 | Grawrock | |
| 6,957,336 B2 | 10/2005 | Wheeler et al. | |
| 6,961,412 B2 | 11/2005 | Ruckart et al. | |
| 6,991,157 B2 | 1/2006 | Bishop et al. | |
| 6,992,978 B1 * | 1/2006 | Humblet et al. | 370/228 |
| 7,003,495 B1 | 2/2006 | Burger et al. | |
| 7,024,174 B2 | 4/2006 | Nagy et al. | |
| 7,024,396 B2 | 4/2006 | Woodward | |
| 7,028,891 B2 | 4/2006 | O'Neal | |
| 7,043,451 B2 | 5/2006 | Strayer et al. | |
| 7,054,842 B2 | 5/2006 | James | |
| 7,069,248 B2 | 6/2006 | Huber | |
| 7,072,864 B2 | 7/2006 | Brake et al. | |
| 7,073,196 B1 | 7/2006 | Dowd et al. | |
| 7,073,198 B1 * | 7/2006 | Flowers et al. | 726/25 |
| 7,083,084 B2 | 8/2006 | Graves et al. | |
| 7,085,931 B1 | 8/2006 | Smith et al. | |
| 7,086,584 B2 | 8/2006 | Stoutenburg et al. | |
| 7,090,138 B2 | 8/2006 | Rettenmyer | |
| 7,093,761 B2 | 8/2006 | Smith et al. | |
| 7,096,003 B2 * | 8/2006 | Joao et al. | 455/406 |
| 7,103,347 B2 | 9/2006 | Chow et al. | |
| 7,103,577 B2 | 9/2006 | Blair et al. | |
| 7,107,249 B2 | 9/2006 | Dively et al. | |
| 7,131,578 B2 | 11/2006 | Paschini et al. | |
| 7,131,582 B2 | 11/2006 | Welton | |
| 7,145,989 B1 | 12/2006 | Bond | |
| 7,168,615 B2 | 1/2007 | Smith et al. | |
| 7,171,199 B1 * | 1/2007 | Rahman | 455/433 |
| 7,194,438 B2 | 3/2007 | Sovio et al. | |
| 7,195,151 B2 | 3/2007 | Licciardello et al. | |
| 7,209,889 B1 | 4/2007 | Whitfield | |
| 7,209,890 B1 | 4/2007 | Peon et al. | |
| 7,222,101 B2 | 5/2007 | Bishop et al. | |
| 7,229,006 B2 | 6/2007 | Babbi et al. | |
| 7,243,839 B2 | 7/2007 | Beck et al. | |
| 7,246,097 B2 | 7/2007 | Movalli | |
| 7,249,054 B2 | 7/2007 | Keil | |
| 7,249,097 B2 | 7/2007 | Hutchison et al. | |
| 7,249,175 B1 * | 7/2007 | Donaldson | 709/225 |
| 7,260,381 B2 | 8/2007 | Lipsit | |
| 7,269,256 B2 | 9/2007 | Rosen | |
| 7,272,385 B2 | 9/2007 | Mirouze et al. | |
| 7,292,998 B2 | 11/2007 | Graves | |
| 7,293,704 B2 | 11/2007 | Smith | |
| 7,311,249 B2 | 12/2007 | Smith et al. | |
| 7,328,190 B2 | 2/2008 | Smith et al. | |
| 7,333,955 B2 | 2/2008 | Graves et al. | |
| 7,363,265 B2 | 4/2008 | Horgan | |
| 7,370,012 B2 | 5/2008 | Karns | |
| 7,376,431 B2 | 5/2008 | Niedermeyer | |
| 7,376,583 B1 | 5/2008 | Rolf | |
| 7,398,248 B2 | 7/2008 | Phillips et al. | |
| 7,437,328 B2 | 10/2008 | Graves et al. | |
| 7,483,862 B1 | 1/2009 | Robinson et al. | |
| 7,536,349 B1 | 5/2009 | Mik | |
| 7,566,000 B2 | 7/2009 | Agostino et al. | |
| 7,580,859 B2 | 8/2009 | Economy | |
| 7,650,308 B2 | 1/2010 | Nguyen et al. | |
| 7,690,580 B2 | 4/2010 | Shoemaker | |
| 7,866,548 B2 | 1/2011 | Reed et al. | |
| 7,941,373 B1 | 5/2011 | Chang et al. | |
| 8,046,268 B2 | 10/2011 | Hunt | |
| 8,060,413 B2 | 11/2011 | Castell et al. | |
| 8,082,210 B2 | 12/2011 | Hansen et al. | |
| 8,195,568 B2 | 6/2012 | Singhal | |
| 2001/0000808 A1 | 5/2001 | Lesley | |
| 2001/0001321 A1 | 5/2001 | Resnick | |
| 2001/0001856 A1 | 5/2001 | Gould | |
| 2001/0005840 A1 | 6/2001 | Verkama | |
| 2001/0023415 A1 | 9/2001 | Keil | |
| 2001/0032878 A1 | 10/2001 | Tsiounis et al. | |
| 2001/0033752 A1 | 10/2001 | Cook et al. | |
| 2001/0034707 A1 | 10/2001 | Sakaguchi | |
| 2001/0042784 A1 | 11/2001 | Fite | |

(56) References Cited

U.S. PATENT DOCUMENTS

| | | |
|---|---|---|
| 2001/0044293 A1 | 11/2001 | Morgan |
| 2002/0004889 A1 | 1/2002 | Honma et al. |
| 2002/0009538 A1 | 1/2002 | Arai |
| 2002/0022472 A1 | 2/2002 | Watler et al. |
| 2002/0022966 A1 | 2/2002 | Horgan |
| 2002/0023217 A1 | 2/2002 | Wheeler et al. |
| 2002/0025797 A1* | 2/2002 | Joao et al. ............. 455/406 |
| 2002/0035539 A1 | 3/2002 | O'Connell |
| 2002/0040935 A1 | 4/2002 | Weyant |
| 2002/0069139 A1 | 6/2002 | Bernstein et al. |
| 2002/0077076 A1 | 6/2002 | Suryanarayana |
| 2002/0077993 A1 | 6/2002 | Immonen et al. |
| 2002/0088851 A1 | 7/2002 | Hodes |
| 2002/0088855 A1 | 7/2002 | Hodes |
| 2002/0091573 A1 | 7/2002 | Hodes |
| 2002/0095387 A1 | 7/2002 | Sosa et al. |
| 2002/0100803 A1 | 8/2002 | Sehr |
| 2002/0101966 A1 | 8/2002 | Nelson |
| 2002/0107804 A1* | 8/2002 | Kravitz ............. 705/51 |
| 2002/0115424 A1 | 8/2002 | Bagoren |
| 2002/0116329 A1 | 8/2002 | Serbetcioglu et al. |
| 2002/0119767 A1 | 8/2002 | Fieldhouse |
| 2002/0126532 A1 | 9/2002 | Matsunaga et al. |
| 2002/0133457 A1 | 9/2002 | Gerlach |
| 2002/0133467 A1 | 9/2002 | Hobson et al. |
| 2002/0138351 A1 | 9/2002 | Houvener |
| 2002/0138450 A1 | 9/2002 | Kremer |
| 2002/0152123 A1 | 10/2002 | Giordano et al. |
| 2002/0152179 A1 | 10/2002 | Racov |
| 2002/0153414 A1 | 10/2002 | Stoutenburg et al. |
| 2002/0161631 A1 | 10/2002 | Banerjee et al. |
| 2002/0169623 A1 | 11/2002 | Call et al. |
| 2002/0169713 A1 | 11/2002 | Chang et al. |
| 2002/0175207 A1 | 11/2002 | Kashef et al. |
| 2002/0190123 A1 | 12/2002 | Anvekar et al. |
| 2003/0001005 A1 | 1/2003 | Risafi et al. |
| 2003/0004737 A1 | 1/2003 | Conquest et al. |
| 2003/0004889 A1 | 1/2003 | Fiala |
| 2003/0004891 A1 | 1/2003 | Van Rensburg et al. |
| 2003/0009382 A1 | 1/2003 | D Arbeloff et al. |
| 2003/0014266 A1 | 1/2003 | Brown et al. |
| 2003/0014360 A1 | 1/2003 | Arditti |
| 2003/0019770 A1 | 1/2003 | Hodes |
| 2003/0028481 A1 | 2/2003 | Flitcroft et al. |
| 2003/0033246 A1 | 2/2003 | Slater |
| 2003/0038175 A1 | 2/2003 | Welton |
| 2003/0046222 A1 | 3/2003 | Bard |
| 2003/0055782 A1 | 3/2003 | Slater |
| 2003/0061157 A1* | 3/2003 | Hirka et al. ............. 705/39 |
| 2003/0069846 A1 | 4/2003 | Marcon |
| 2003/0070080 A1 | 4/2003 | Rosen |
| 2003/0078835 A1 | 4/2003 | Pluchinske |
| 2003/0088462 A1 | 5/2003 | Carrithers et al. |
| 2003/0092435 A1 | 5/2003 | Boivin |
| 2003/0105672 A1 | 6/2003 | Epstein |
| 2003/0115126 A1 | 6/2003 | Pitroda |
| 2003/0126079 A1 | 7/2003 | Roberson et al. |
| 2003/0135462 A1 | 7/2003 | Brake |
| 2003/0144909 A1 | 7/2003 | Flaherty et al. |
| 2003/0144935 A1 | 7/2003 | Sobek |
| 2003/0163389 A1 | 8/2003 | Murten et al. |
| 2003/0172031 A1 | 9/2003 | Graves et al. |
| 2003/0174823 A1 | 9/2003 | Justice |
| 2003/0187780 A1 | 10/2003 | Arthus et al. |
| 2003/0194988 A1 | 10/2003 | Knox |
| 2003/0200179 A1 | 10/2003 | Kwan |
| 2003/0200184 A1 | 10/2003 | Dominguez et al. |
| 2003/0204457 A1 | 10/2003 | Arias |
| 2003/0205616 A1 | 11/2003 | Graves et al. |
| 2003/0212796 A1 | 11/2003 | Willard |
| 2003/0218062 A1 | 11/2003 | Noriega et al. |
| 2003/0220884 A1 | 11/2003 | Choi et al. |
| 2003/0222135 A1 | 12/2003 | Stoutenburg |
| 2003/0226042 A1 | 12/2003 | Fukushima |
| 2003/0233317 A1 | 12/2003 | Judd |
| 2003/0236704 A1 | 12/2003 | Antonucci |
| 2004/0007618 A1 | 1/2004 | Oram et al. |
| 2004/0009760 A1 | 1/2004 | Laybourn et al. |
| 2004/0019568 A1 | 1/2004 | Moenickheim et al. |
| 2004/0024697 A1 | 2/2004 | Landa et al. |
| 2004/0039639 A1 | 2/2004 | Walker et al. |
| 2004/0039702 A1 | 2/2004 | Blair et al. |
| 2004/0046035 A1 | 3/2004 | Davila et al. |
| 2004/0049427 A1 | 3/2004 | Tami et al. |
| 2004/0054587 A1 | 3/2004 | Dev et al. |
| 2004/0064412 A1 | 4/2004 | Phillips et al. |
| 2004/0068448 A1 | 4/2004 | Kim |
| 2004/0078332 A1 | 4/2004 | Ferguson et al. |
| 2004/0107170 A1 | 6/2004 | Labrou et al. |
| 2004/0114766 A1 | 6/2004 | Hileman et al. |
| 2004/0118914 A1 | 6/2004 | Smith et al. |
| 2004/0128395 A1 | 7/2004 | Miyazaki |
| 2004/0129777 A1 | 7/2004 | Smith |
| 2004/0133511 A1 | 7/2004 | Smith et al. |
| 2004/0153402 A1 | 8/2004 | Smith et al. |
| 2004/0159700 A1 | 8/2004 | Khan et al. |
| 2004/0162058 A1 | 8/2004 | Mottes |
| 2004/0167821 A1 | 8/2004 | Baumgartner |
| 2004/0172339 A1 | 9/2004 | Snelgrove et al. |
| 2004/0181453 A1 | 9/2004 | Ray |
| 2004/0182922 A1 | 9/2004 | Talarico, Jr. |
| 2004/0188516 A1 | 9/2004 | De Myttennaere |
| 2004/0195316 A1* | 10/2004 | Graves et al. ............. 235/380 |
| 2004/0199431 A1 | 10/2004 | Ganesan et al. |
| 2004/0199474 A1 | 10/2004 | Ritter |
| 2004/0205023 A1 | 10/2004 | Hafer et al. |
| 2004/0206814 A1 | 10/2004 | Kawai et al. |
| 2004/0210449 A1 | 10/2004 | Breck |
| 2004/0210476 A1 | 10/2004 | Blair et al. |
| 2004/0210519 A1 | 10/2004 | Oppenlander |
| 2004/0215560 A1 | 10/2004 | Amalraj et al. |
| 2004/0215564 A1 | 10/2004 | Lawlor |
| 2004/0215573 A1 | 10/2004 | Teutenberg |
| 2004/0218741 A1 | 11/2004 | Welton |
| 2004/0230536 A1 | 11/2004 | Fung et al. |
| 2004/0232225 A1 | 11/2004 | Bishop |
| 2004/0249766 A1 | 12/2004 | Ganesan et al. |
| 2004/0260602 A1 | 12/2004 | Nakaminami et al. |
| 2004/0260646 A1 | 12/2004 | Berardi et al. |
| 2004/0267663 A1 | 12/2004 | Karns |
| 2005/0001027 A1 | 1/2005 | Bahar |
| 2005/0027655 A1 | 2/2005 | Sharma et al. |
| 2005/0033645 A1 | 2/2005 | Duphily |
| 2005/0051619 A1 | 3/2005 | Graves et al. |
| 2005/0060248 A1 | 3/2005 | O'Neal |
| 2005/0061872 A1 | 3/2005 | Paschini et al. |
| 2005/0071268 A1 | 3/2005 | Riddett |
| 2005/0075958 A1 | 4/2005 | Gonzalez |
| 2005/0079863 A1 | 4/2005 | Macaluso |
| 2005/0080678 A1 | 4/2005 | Economy |
| 2005/0086171 A1 | 4/2005 | Abe et al. |
| 2005/0092828 A1 | 5/2005 | Phillips et al. |
| 2005/0092829 A1 | 5/2005 | Phillips et al. |
| 2005/0103839 A1 | 5/2005 | Hewel |
| 2005/0107068 A1 | 5/2005 | Smith et al. |
| 2005/0108096 A1 | 5/2005 | Burger et al. |
| 2005/0125300 A1 | 6/2005 | McGill et al. |
| 2005/0125348 A1 | 6/2005 | Fulton et al. |
| 2005/0127169 A1 | 6/2005 | Foss et al. |
| 2005/0131815 A1 | 6/2005 | Fung et al. |
| 2005/0143051 A1 | 6/2005 | Park |
| 2005/0149387 A1 | 7/2005 | O'Shea et al. |
| 2005/0182678 A1 | 8/2005 | Walker et al. |
| 2005/0182720 A1 | 8/2005 | Willard et al. |
| 2005/0184145 A1 | 8/2005 | Law et al. |
| 2005/0199705 A1 | 9/2005 | Beck et al. |
| 2005/0202850 A1 | 9/2005 | Kuty |
| 2005/0203835 A1 | 9/2005 | Nhaissi |
| 2005/0228717 A1 | 10/2005 | Gusler et al. |
| 2005/0228720 A1 | 10/2005 | Pavlic et al. |
| 2005/0234820 A1 | 10/2005 | Mackouse |
| 2005/0240472 A1 | 10/2005 | Postrel |
| 2005/0240526 A1 | 10/2005 | Hill |
| 2005/0242171 A1 | 11/2005 | Smets et al. |

(56) References Cited

U.S. PATENT DOCUMENTS

| | | |
|---|---|---|
| 2005/0242193 A1 | 11/2005 | Smith et al. |
| 2005/0259589 A1 | 11/2005 | Rozmovits et al. |
| 2005/0261968 A1 | 11/2005 | Randall et al. |
| 2005/0263587 A1 | 12/2005 | Martinez |
| 2005/0269401 A1 | 12/2005 | Spitzer et al. |
| 2005/0269402 A1 | 12/2005 | Spitzer et al. |
| 2005/0278216 A1 | 12/2005 | Graves |
| 2006/0019634 A1 | 1/2006 | Hawkes |
| 2006/0020543 A1 | 1/2006 | Sheehan et al. |
| 2006/0023856 A1 | 2/2006 | Welton |
| 2006/0026073 A1 | 2/2006 | Kenny, Jr. |
| 2006/0030306 A1 | 2/2006 | Kuhn |
| 2006/0035632 A1 | 2/2006 | Sorvari et al. |
| 2006/0053056 A1 | 3/2006 | Alspach-Goss |
| 2006/0085335 A1 | 4/2006 | Crawford et al. |
| 2006/0100927 A1 | 5/2006 | Zormati |
| 2006/0113376 A1 | 6/2006 | Reed et al. |
| 2006/0123243 A1 | 6/2006 | Shimosato et al. |
| 2006/0144926 A1 | 7/2006 | Jacobs |
| 2006/0157556 A1 | 7/2006 | Halbur et al. |
| 2006/0161490 A1 | 7/2006 | Chakiris |
| 2006/0163343 A1 | 7/2006 | Changryeol |
| 2006/0163347 A1 | 7/2006 | Foss, Jr. et al. |
| 2006/0167780 A1 | 7/2006 | Friedman |
| 2006/0169766 A1 | 8/2006 | Hoch |
| 2006/0186196 A1 | 8/2006 | Schultz et al. |
| 2006/0207856 A1 | 9/2006 | Dean |
| 2006/0213968 A1 | 9/2006 | Guest et al. |
| 2006/0213980 A1 | 9/2006 | Geller et al. |
| 2006/0213985 A1 | 9/2006 | Walker et al. |
| 2006/0217996 A1 | 9/2006 | Graves |
| 2006/0229985 A1 | 10/2006 | Lalwani et al. |
| 2006/0231609 A1 | 10/2006 | Lazarowicz et al. |
| 2006/0231611 A1 | 10/2006 | Chakiris et al. |
| 2006/0235754 A1 | 10/2006 | Walker |
| 2006/0249569 A1 | 11/2006 | Jain |
| 2006/0249570 A1 | 11/2006 | Seifert et al. |
| 2006/0255125 A1 | 11/2006 | Jennings et al. |
| 2006/0255135 A1 | 11/2006 | Smith |
| 2006/0261150 A1 | 11/2006 | Seifert et al. |
| 2006/0271489 A1 | 11/2006 | Flanagan et al. |
| 2006/0277146 A1 | 12/2006 | Dively et al. |
| 2006/0289621 A1 | 12/2006 | Foss, Jr. |
| 2007/0007333 A1 | 1/2007 | Foss et al. |
| 2007/0043682 A1 | 2/2007 | Drapkin et al. |
| 2007/0057045 A1 | 3/2007 | Beck et al. |
| 2007/0063024 A1 | 3/2007 | Guillot |
| 2007/0108269 A1 | 5/2007 | Benco et al. |
| 2007/0118478 A1* | 5/2007 | Graves et al. ............... 705/44 |
| 2007/0119920 A1 | 5/2007 | Hogg et al. |
| 2007/0167161 A1 | 7/2007 | Cheng et al. |
| 2007/0179865 A1 | 8/2007 | Hibler et al. |
| 2007/0185782 A1 | 8/2007 | Shooks et al. |
| 2007/0187490 A1 | 8/2007 | Feldman et al. |
| 2007/0284434 A1 | 12/2007 | Fletcher |
| 2008/0010215 A1 | 1/2008 | Rackley, III et al. |
| 2008/0033817 A1 | 2/2008 | Billmaier et al. |
| 2008/0041938 A1 | 2/2008 | Wise |
| 2008/0052770 A1* | 2/2008 | Ali et al. ..................... 726/9 |
| 2008/0091545 A1 | 4/2008 | Jennings et al. |
| 2008/0103972 A1 | 5/2008 | Lanc |
| 2008/0109356 A1 | 5/2008 | Sutton |
| 2008/0109374 A1* | 5/2008 | Levergood et al. ........... 705/75 |
| 2009/0078755 A1* | 3/2009 | Sullivan et al. ............. 235/375 |
| 2009/0157554 A1 | 6/2009 | Hobson et al. |
| 2009/0298427 A1 | 12/2009 | Wilkinson et al. |
| 2010/0005025 A1 | 1/2010 | Kumar et al. |
| 2010/0063906 A1 | 3/2010 | Nelsen et al. |
| 2010/0130172 A1 | 5/2010 | Vendrow et al. |
| 2010/0186076 A1* | 7/2010 | Ali et al. ..................... 726/9 |
| 2010/0306107 A1* | 12/2010 | Nahari ......................... 705/44 |
| 2010/0317319 A1* | 12/2010 | Gorman et al. ............. 455/410 |
| 2011/0068168 A1* | 3/2011 | Graves et al. ............... 235/379 |
| 2011/0082772 A1 | 4/2011 | Hirson |
| 2011/0087592 A1 | 4/2011 | Van Der et al. |
| 2011/0173083 A1 | 7/2011 | Reed et al. |
| 2011/0196753 A1 | 8/2011 | Hodgdon et al. |
| 2011/0270693 A1 | 11/2011 | Paschini et al. |
| 2013/0024916 A1* | 1/2013 | Evans ......................... 726/5 |
| 2013/0041767 A1* | 2/2013 | Hollander et al. ........... 705/17 |

FOREIGN PATENT DOCUMENTS

| | | |
|---|---|---|
| EP | 1197906 | 4/2002 |
| EP | 1 164 777 | 10/2003 |
| EP | 1 361 775 | 11/2003 |
| EP | 1361775 | 11/2003 |
| EP | 1522972 | 9/2004 |
| EP | 1534043 | 11/2004 |
| EP | 1519332 A | 3/2005 |
| EP | 1705610 | 3/2006 |
| GB | 2333878 A | 8/1999 |
| JP | 2006309729 A | 11/2006 |
| WO | 96/38801 | 12/1996 |
| WO | 96/41462 | 12/1996 |
| WO | 97/10560 | 3/1997 |
| WO | 97/46961 | 12/1997 |
| WO | 98/44429 | 10/1998 |
| WO | 98/49658 | 11/1998 |
| WO | 99/63744 | 12/1999 |
| WO | 00/50986 | 8/2000 |
| WO | WO0102233 | 1/2001 |
| WO | WO 01/02233 | 3/2001 |
| WO | 03/079159 | 9/2003 |
| WO | 2004001646 A | 12/2003 |
| WO | 2004012118 A | 2/2004 |
| WO | 2005/024591 | 9/2004 |
| WO | 2005098770 A | 10/2005 |
| WO | WO2005098770 | 10/2005 |

OTHER PUBLICATIONS

Shermach, Kelly: The Vibrant World of Loyalty. Credit Card Management, vol. 15, n.5, Aug. 2002. pp. 30-40.

Michlig, Greg: Fork in the Road. Credit Card Management, vol. 22, n.10, Oct. 1999. pp. 36-38.

Shermach, Kelly: The Vibrant World of Loyalty: Creative Levels are High. Credit Card Management, vol. 15, n.5, Aug. 2002.

Hypercom Introduces Quick Service Payment Options for the Retail and Restaurant Countertop and Drive-Through. Business Wire, Apr. 11, 2002. p. 140.

NOVA Teams with Prior to Offer Merchants Online Affinity Program. Phillips Business Information, vol. 14, Iss. 17, Sep. 8, 1999.

Refocus Efforts to Prevent Fraud. Phillips Business Information, vol. 11, Iss. 25, Dec. 23, 1996.

Technology Stems credit Card Fraud. Phillips Business Information, vol. 13, Iss. 24, Nov. 20, 1996.

Dahl, Judy: Card Fraud. Credit Union Magazine, vol. 2, n6. Jun. 2006. pp. 46-51.

Krebsbach, Karen: ID Verification: Biometric IDs Come of Age. Bank Technology, Jul. 2003. p. 10.

Michlig Greg: To Catch a Thief. Credit Union Management, vol. 24, n1. Jan. 2001. pp. 48-50.

Anderson, Douglas, et al.: Risk Management Monograph. Retail Delivery Strategies, vol. 6, Autumn 1995. pp. 7-22.

Smart Card Update. Retail Delivery System News. Phillips Business Information. vol. 2, Iss. 19. Sep. 26, 1997.

Shaw, John: The European Development Director at Carlson Campaign. Apr. 8, 2004. p. 7.

Borosky, Mark: A Long and Winding Road. Credit Card Management, vol. 8, N3, Jun. 1995. pp. 58-63.

The Gale Group: Online bill Payment May Exceed $200 Billion in 2003, NACHA Says. Electronic Commerce News, vol. 8, n. 12. Jun. 9, 2003.

The Gale Group: Outside Help for Online Banking. Information Week. Mar. 16, 1998. p. 85.

Fisher, Betty-Lin: Ohio Study Warns Utility Customers of Potential Payment Troubles. Knight-Ridder Tribune Business News, Akron Beacon Journal. Sep. 8, 2004.

(56) References Cited

OTHER PUBLICATIONS

Certergy Awarded Five-Year Agreement with Chartway. PR Newswire (US). Aug. 27, 2003.
Online Bill Payment Comes of Age, according to NACHA. PR Newswire, May 27, 2003.
Online Bill Payment May Exceed $200 Billion in 2003. Phillips Business Information, vol. 14, Issue 12. Jun. 5, 2003.
Credit Card Issuer Has No Duty to Verify Payment Checks. Bankers Letter of the Law, vol. 36, N12. Dec. 2002.
Lucas, Peter. Retail Cards Get Connected. Credit Card Management, vol. 14, N11, Jan. 2002. pp. 18-23.
Barthell, Matt: Consumer Poll—Checks Lead in Convenience. American Banker, vol. 159, No. 225. Nov. 22, 2004. p. 15.
E2Interactive, Inc et al. v. Blackhawk Network, Inc. Case No. 09-CV-629. Western District of Wisconsin. Complaint for Patent Infringement and Demand for Jury Trial.
E2Interactive, Inc et al. v. Blackhawk Network, Inc. Case No. 09-CV-629. Western District of Wisconsin. U.S. Patent No. 7,578,439. Patent at Issue.
E2Interactive, Inc et al. v. Blackhawk Network, Inc. Case No. 09-CV-629. Western District of Wisconsin. Plaintiffs E2Interactive, Inc. and Interactive Communications International, Inc.'s Motion to Dismiss and Strike Blackhawk Network, Inc.'s Inequitable Conduct Counterclaim and Affirmative Defense.
E2Interactive, Inc et al. v. Blackhawk Network, Inc. Case No. 09-CV-629. Western District of Wisconsin. Civil Cover Sheet.
E2Interactive, Inc et al. v. Blackhawk Network, Inc. Case No. 09-CV-629. Western District of Wisconsin. Summons in a Civil Action.
E2Interactive, Inc et al. v. Blackhawk Network, Inc. Case No. 09-CV-629. Western District of Wisconsin. Report on the Filing or Determination of an Action Regarding a Patent or Trademark.
E2Interactive, Inc et al. v. Blackhawk Network, Inc. Case No. 09-CV-629. Western District of Wisconsin. Blackhawk Network Inc.'s Answer to Complaint and Counterclaim.
E2Interactive, Inc et al. v. Blackhawk Network, Inc. Case No. 09-CV-629. Western District of Wisconsin. Plaintiffs' Answer to Defendant's Counterclaims.
E2Interactive, Inc et al. v. Blackhawk Network, Inc. Case No. 09-CV-629. Western District of Wisconsin. Blackhawk Network Inc.'s Amended Answer to Complaint and Amended Counterclaims.
E2Interactive, Inc et al. v. Blackhawk Network, Inc. Case No. 09-CV-629. Western District of Wisconsin. Blackhawk Network Inc.'s Memorandum in Opposition to Motion to Dismiss and Strike Blackhawk's Inequitable Conduct Counterclaim and Affirmative Defense.
Request for Ex Parte Reexamination of U.S. Patent No. 7,578,439.
Exhibits A—H of Request for Ex Parte Reexamination of U.S. Patent No. 7,578,439.
USPTO Grant of Ex Parte Reexamination of U.S. Patent No. 7,578,439.
Non-Final Office Action in Ex Parte Reexamination of U.S. Patent No. 7,578,439, Reexam Control No. 90/011,070.
Request for Inter Parties Reexamination of U.S. Patent No. 7,578,439, Reexam Control No. 95/001,464.
Preliminary Invalidity Contentions of U.S. Patent No. 7,578,439.
Petition to Review Denial of Inter Parties Reexamination of U.S. Patent No. 7,578,439, Reexam Control No. 95/001,464.
International Standard ISO 8583, "Financial transaction card originated messages—Interchange message specifications," Second Edition, Dec. 15, 1993 ("ISO 8583").
William Wood, POS Terminals nab credit violators, Data Communications, Oct. 1982 at 114 ("Wood 1982").
Press Release, First Data Corp, CES/NaBANCO Introduces Stored Value Card Technology: Blockbuster Video is First Merchant Partner, Jan. 15, 1996.
Blockbuster Wraps Prepaid Product in Greeting Cards for Dad and Grad, Debit Card News, Jun. 18, 1997, at 3.
Blockbuster Seeks Branding Partner, Debit Card News, Sep. 28, 1995, at 8.
Press Release, First Data Corp., First Data Supports Pilot for Shell Oil Pre-paid Card, Aug. 29, 1996.
MicroTrax, Ltd., PC Electronic Payment Systems Reference Manual, 1995.
ValueLink Product Information, 1997.
Craig Levitt, Busy Signal, Supermarket Business, Sep. 1998, at 131.
Call Them Just Another Product, Supermarket Business, Feb. 1996, at 81.
Allene Symons, Calling Cards Ring Clear for Drug Chains, Drug Store News, Mar. 1, 1999, at 39.
Bari Adelman, Jockeying for Position, Supermarket Business, Jan. 1999, at 59.
Kmart's Newest Blue Light Special: Cash Cards, Credit Card News, Aug. 15, 1997, at 7.
LCI International Introduces Breakthrough S.A.F.E.R. (SM) System for Universal Point-of-Sale Activation of Prepaid Calling Cards, Business Wire, May 4, 1998, at 1.
Press Release, Qwest Communications International Inc., Qwest Communications selected as Preferred Provider of Prepaid Phone Cards for CITGO Petroleum Corporation, May 3, 1999.
Patricia A. Murphy, New Breeds of Debit Cards Offer Expanded Opportunities for Retailers, Stores, May 1999, at 76.
Lisa Guss, Phone Cards: It's Your Call, Supermarket Business, Jan. 1998, at 51.
Pictured Much Smaller Than Actual Size, Supermarket News, May 1994.
Retailers Expand Stored Value Cards as Alternative to Paper Gift Certificates, Stores, Nov. 1998, at 28.
Michael Hartnett, Retailers Flock to Pre-paid Phone Cards, Stores, Jul. 1996, at 54.
Carol Radice, Ringing Up Sales, Progressive Grocer, Jan. 1996, at 141.
Seth Mendelson, Serious Numbers, Oct. 1996, at 51.
SmarTalk Launches Point-of-Sale Activation for Prepaid Phone Cards Via American Express Card Authorization System, Business Wire, Aug. 24, 1998, at 1.
SmarTalk Will Use the American Express Brand to Go Global, Credit Card News, Jan. 15, 1998, at 6.
Sprint Streamlines Card Activation, Supermarket Business, Dec. 1997, at 43.
Laurie Freeman, Supermarkets Get the Call, Supermarket Business, May 1999, at 127.
Smart Card Update, Retail Delivery Systems News, Sep. 26, 1997.
Press Release, DataCash Ltd., Innovative & Improved Services with DataCash 2.4, Oct. 7, 1998.
In Search of the Complete Web Payment System, Electronic Commerce News, May 27, 1996, at 1.
EFT at the Point-of-Sale, ICP Banking Software, Autumn 1985, at 9.
European Patent Office, "Description of DE 19641776.".
David Legg, Debit Cards—the Retailer's Perspective, Banking World, Jun. 1988, at 60.
Robert Jennings, First Data and Celltel Offering Wireless Credit Authorization, American Banker, Mar. 21, 1995, at 11.
Matt Barthel, Nyce Offers a PC System for Point-of-Sale Operations, American Banker, Mar. 31, 1992, at 3.
Rob Wells, Authorizing a Credit-Card Sale is Incredible 20-Second Journey in Electronic Banking, The Sale Lake Tribune, Dec. 19, 1993, at F10.
Roger Clarke, Privacy Issues in Smart Card Applications in the Retail Financial Sector, in Smart Cards and the Future of Your Money, Jun. 1996, at 157.
Robert Fram et al., Altered States: Electronic Commerce and Owning the Means of Value Exchange, 1999 Stan. Tech. L. Rev. 2 (1999),http://stlr.stanford.edu/STLR/Articles/99_STLR_2.
Gerald Sruber, The Electronic Purse: An Overview of Recent Developments and Policy Issues, Bank of Canada, Jan. 1996.
John P. Caskey & Gordon H. Sellon, Jr., Is the Debit Card Revolution Finally Here?, Federal Reserve Bank of Kansas City Economic Review, Fourth Quarter 1994, at 79.
Stacey L. Schreft, Looking Forward: The Role for Government in Regulating Electronic Cash, Federal Reserve Bank of Kansas City Economic Review, Fourth Quarter 1997, at 59.

(56) References Cited

OTHER PUBLICATIONS

Basle, Security of Electronic Money, Report by the Committee on Payment and Settlement Systems and the Group of Computer Experts of the Central Banks of the Group of Ten Countries, Aug. 1996.

William Roberds, What's Really New about the New Forms of Retail Payment?, Federal Reserve Bank of Atlanta Economic Review, First Quarter 1997, at 32.

Felix Stalder & Andrew Clement, Exploring Policy Issues of Electronic Cash: The Mondex Case, Canadian Journal of Communication, vol. 24, No. 2 (1999).

IBM 4680 General Sales Application Electronic Funds User's Guide, First Edition, Dec. 1990.

Electronic Funds Transfer Feature Enhancement: User's Guide, First Edition, Sep. 1995.

IBM 4680-4690 Advanced Payment System for General Sales Application, Second Edition, Jul. 1996.

U.S. Appl. No. 60/108,762, "Electronic Payment System", David Resnick, Published Feb. 6, 2001.

U.S. Appl. No. 60/141,994, "Precash Payment System", David Resnick, published Feb. 6, 2001.

European Search Report, Application No. 04256999.6-2412, dated May 7, 2007.

International Search Report, PCT Application No. PCT/US07/66598, dated Nov. 13, 2007, 9 pages.

Sep. 26, 1997, Smart Card Update, vol. 2, Issue 19; Retail Delivery Systems News; Phillips Business Information.

\* cited by examiner

SYSTEM AND METHOD FOR SECURELY AUTHORIZING AND DISTRIBUTING STORED-VALUE CARD DATA

RELATED APPLICATIONS

This application is a continuation-in-part of U.S. application Ser. No. 10/411,971, filed Apr. 11, 2003, now U.S. Pat. No. 7,083,084, which is a continuation of U.S. application Ser. No. 09/641,363 filed on Aug. 18, 2000, now U.S. Pat. No. 6,575,361, which claims priority to U.S. Provisional Application No. 60/149,740 filed on Aug. 19, 1999, all of which are incorporated herein by reference. This application is related to U.S. application Ser. No. 10/253,243 filed on Sep. 24, 2002 and International Application No. PCT/US02/30281 filed Sep. 24, 2002, which claim priority to U.S. Provisional Application No. 60/396,404 filed Jul. 15, 2002 and U.S. Provisional Application No. 60/324,333 filed on Sep. 24, 2001, which are all incorporated herein by reference.

FIELD OF THE INVENTION

The present invention is generally related to remote data authorization and distribution. More particularly, the present invention is related to a system and method for securely authorizing and distributing stored-value card data between a plurality of users and a central processor over a communications network.

BACKGROUND OF THE INVENTION

Stored-value cards can be authorized and distributed over communications networks. Examples of communications networks include dedicated telephone lines, public telephone links, and the internet or other networked communication. The data of the stored-value cards is related to services and/or products prepaid by the owner or end user of the card. Examples of prepaid services that may be accommodated by the stored-value data include long distance telephone communication, wireless communication, paging and internet-enabled communication services, including wireless web access. Other examples of prepaid services and/or products that may be accommodated by the stored-value card include gift cards, prepaid gas cards, prepaid grocery cards, prepaid entertainment cards, downloadable ring tone cards, downloadable game cards, downloadable music cards that use MP3, MP4, WMV, WAV, or other music formats, any other downloadable software card, customer rewards cards, and any other type of stored-value cards for products, services, or both, that may be prepaid by the owner of the card.

Stored-value cards, such as prepaid long distance phone cards, are generally used in the telephone industry to allow customers to pre-purchase long distance calling time. Each of the cards has a printed identification number. Associated identification information can be magnetically stored therein or printed in a barcode. The identification number is also stored in a file in a database maintained by the card issuer. In the traditional business model, when the cards are sent to the retail location from which they will be sold, the corresponding records in the database are activated, thus allowing the card to be used immediately by a customer. To use the card as a prepaid long distance card, the customer dials a toll free number to access the card issuer's system, enters the identification number, and then makes the desired long-distance call.

These prior art prepaid phone card systems have several disadvantages. For example, since the cards are active while on the shelf in the retail location, the cards may be stolen by a thief and easily used. One way to address some of the drawbacks of prior art prepaid phone card systems would be to install activation terminals unique to the prepaid card issuer. This is referred to as a "closed system." U.S. Pat. No. 5,577,109 to Stimson et al. discloses such a closed system. In the Stimson system, the cards are not preactivated. Each of the retail locations from which cards are to be sold is provided with a dedicated activation terminal which allows the retail operator to set the value of the card at the time of the sale. The activation terminal connects to the card issuer's system to pass along the value amount and to request activation of the card. Depleted cards can be recharged in the same manner as they are sold. A serious disadvantage of the Stimson system is that it requires single-function dedicated hardware to be installed in each retail location, resulting in a very inflexible and expensive system.

U.S. Pat. No. 6,000,608 to Dorf provides a multifunction card system including a prepaid phone card activating system which allows cards to be purchased in varying amounts and to be recharged without requiring the use of a closed system to handle the transactions. Although Dorf purports to alleviate some of the drawbacks of Stimson by using point-of-sale devices connected to a banking system, it is believed that Dorf fails to verify sources of card activation requests so as to enhance detection of potential security breaches that could ensue in any system accessible to a large number of users.

It would be further desirable to provide a system and method for selectively processing stored-value card requests, such as stored-value card activation, deactivation, and/or value change, based on the communications network over which the request is transmitted. Additionally, it would be further desirable to provide a system and method for selectively processing stored-value card requests based on the source of the request, wherein such request can be received over a variety of communications networks that are available to unauthorized users. It would be further desirable to provide a method of determining a plurality of communications networks and a plurality of sources of activation requests that are authorized to carry or make valid requests, respectively, either prior to or at the same time as such requests are made.

BRIEF SUMMARY OF THE INVENTION

Generally speaking, the foregoing needs are fulfilled by providing in one exemplary embodiment a computerized method for securely authorizing and distributing stored-value card data over a communications network. The method allows for storing in the database a plurality of records comprising stored-value card data for each stored-value card and a plurality of records comprising information identifying trusted sources of requests to change the status of a stored-value card and/or information identifying trusted communications networks known to transmit valid requests. Trusted sources can include any requestor, including merchant terminals on a dedicated line, merchant terminals at a particular or identified phone number, and merchant terminals at a particular or identified internet IP address. Trusted communications networks that are identified to be trusted sources may comprise the internet when the requestor has a static IP address or any other computer network such as a WAN or LAN, a dedicated data line such as a dedicated phone line, and a public switched telephone network that provides automatic number identification (ANI). A transmitting step allows for transmitting a request to change the status of a stored-value card over a communications network from a requesting terminal to the central processor. Such communications networks comprise dedicated data lines such as dedicated phone lines, frame relay or X.25 circuits, public telephone links such as a public switched telephone network, and the internet, including networks wherein the merchant terminal is part of a WAN or LAN. The central processor is configured to receive requests from merchant terminals over one or more communications networks and determine whether the respective terminal is a trusted source and/or whether the request was transmitted over a trusted communications network. A processing step allows for processing the request based on the determining step.

In yet another aspect thereof, the present invention fulfills the foregoing needs by providing a computer-readable medium encoded with computer program code for securely authorizing and distributing stored-value card requests over a communications network, the program code causing a computer to execute a method comprising: controlling a database coupled to the central processor; storing in the database a plurality of records comprising stored-value card data for each stored-value card as well as information identifying trusted sources for making stored-value card processing requests and/or information identifying trusted communications networks for carrying or transmitting stored-value card processing requests; receiving a request for processing the stored-value card over a communications network from a requesting terminal to the central processor; determining whether the respective requesting terminal is a trusted source of requests for processing and/or whether the communications network is a trusted communications network for carrying or transmitting requests for processing; and processing the request based on the determining step.

Other embodiments can be considered.

In yet another aspect thereof, the present invention fulfills the foregoing needs by providing a method for securely authorizing stored-value card transactions. The method includes an identifying step for identifying one or more trusted sources of stored-value card processing requests and/or one or more trusted communications networks for carrying and/or transmitting stored-value card processing requests. An assigning step allows for identifiers to be assigned to each identified trusted source and trusted communications network. A storing step allows for storing the identifiers in a database coupled to a processor configured to receive a request to process stored-value cards, wherein the request is received from a user terminal over a communications network. In another step, it is determined whether the respective requesting terminal is a trusted source of requests for processing and/or it is determined whether the communications network is a trusted communications network for carrying or transmitting requests for processing. Finally, the method allows for processing the request based on the determining step.

Other embodiments can be considered.

In yet another aspect thereof, the present invention fulfills the foregoing needs by providing a system for authorizing stored-value card requests over a communications network between a plurality of terminals and a central processor. The system comprises a database coupled to the central processor. The system also comprises a storage module configured to store in the database a plurality of records comprising stored-value card data for each stored-value card as well as information identifying trusted sources for making stored-value card processing requests and/or information identifying trusted communications networks for carrying or transmitting stored-value card processing requests. The system also comprises a value module configured to define in each stored record a parameter corresponding to the value of each respective stored-value card; a first processing module configured to process a request from a respective requesting terminal to the central processor, the central processor configured to accept the request based on whether the request originated from a trusted source and/or whether the request was transmitted or carried by a trusted communications network.

Other embodiments could be considered.

According to yet another embodiment of the invention, a method for securely authorizing stored-value card transactions is provided. The method comprises identifying one or more trusted sources of stored-value card processing requests and/or one or more trusted communications networks for carrying and/or transmitting stored-value card processing requests. An assigning step allows for assigning identifiers to each identified trusted source and trusted communications network. A storing step allows for storing the identifiers in a database coupled to a processor. A receiving step allows for receiving a request to process stored-value cards, wherein the request is received from a user terminal over a communications network. A determining step allows for determining whether the respective requesting terminal is a trusted source of requests for processing and/or determining whether the communications network is a trusted communications network for carrying or transmitting requests for processing. Finally, a processing step allows for processing the request based on the determining step.

Other embodiments could be considered.

Figure 1:
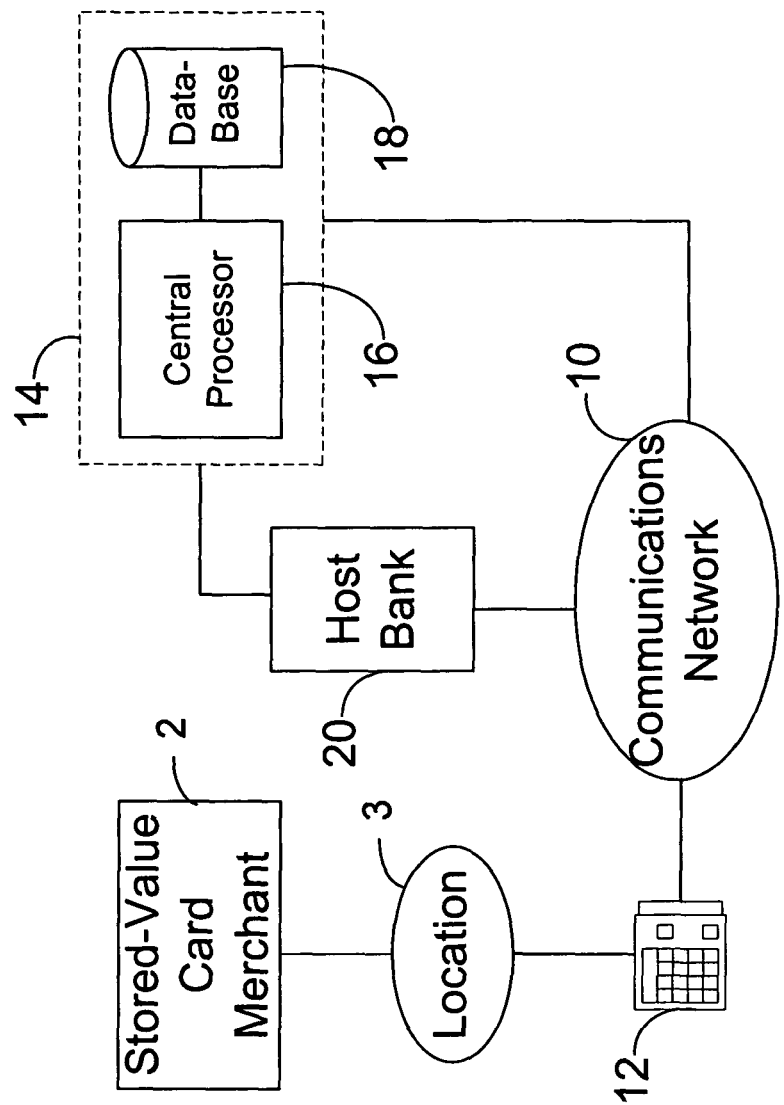
FIGS. 1-4 respectively illustrate schematic block diagrams showing how various exemplary stored-value card user trees, as shown in FIGS. 1-3, may be connected via a communications network to a remote stored-value card data management system embodying the present invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIGS. 1-4 illustrate examples of entity trees that may benefit from the system and techniques of the present invention. For simplicity of illustration, the customer/distributor layer at the top is omitted. Each distributor can have subordinate to it any of the illustrated types of structures. Note that in each case, a merchant 2 is at the top, with a layer of locations 3 just above a layer of terminals 12.

Figure 2:
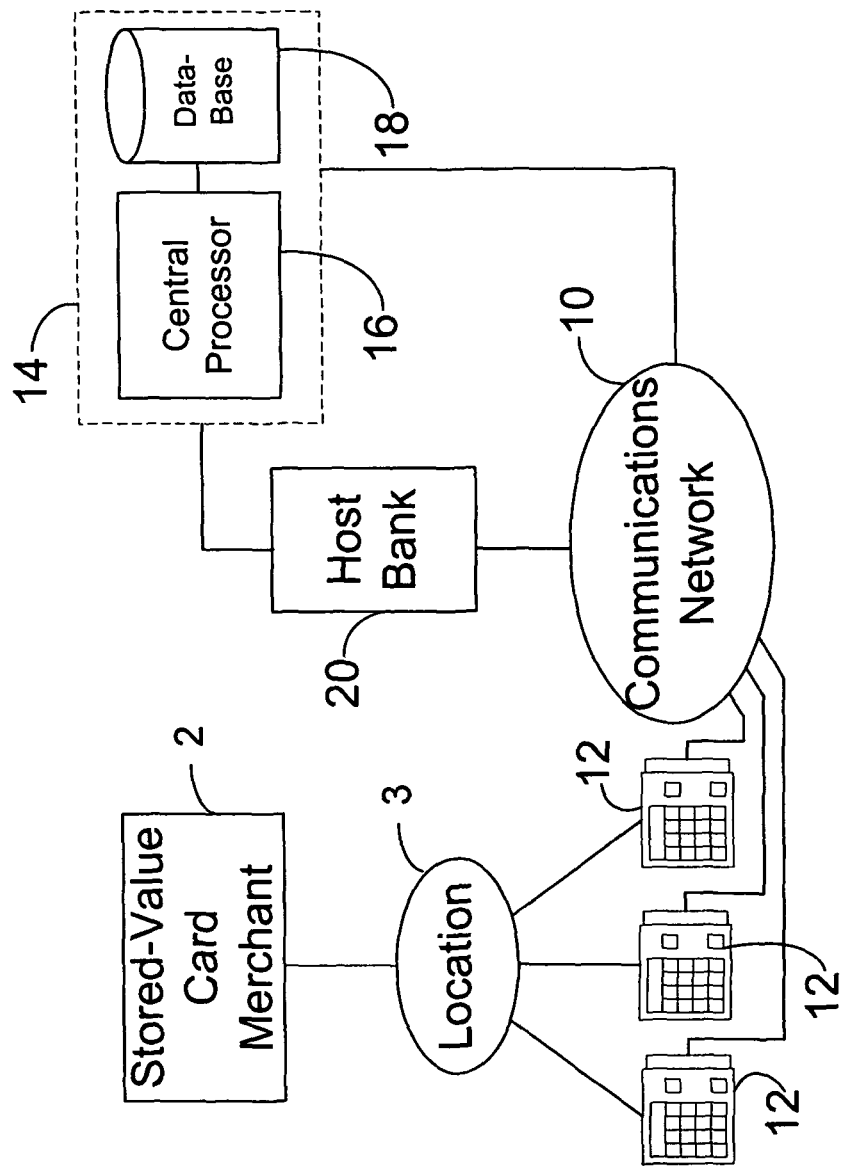
Figure 3:
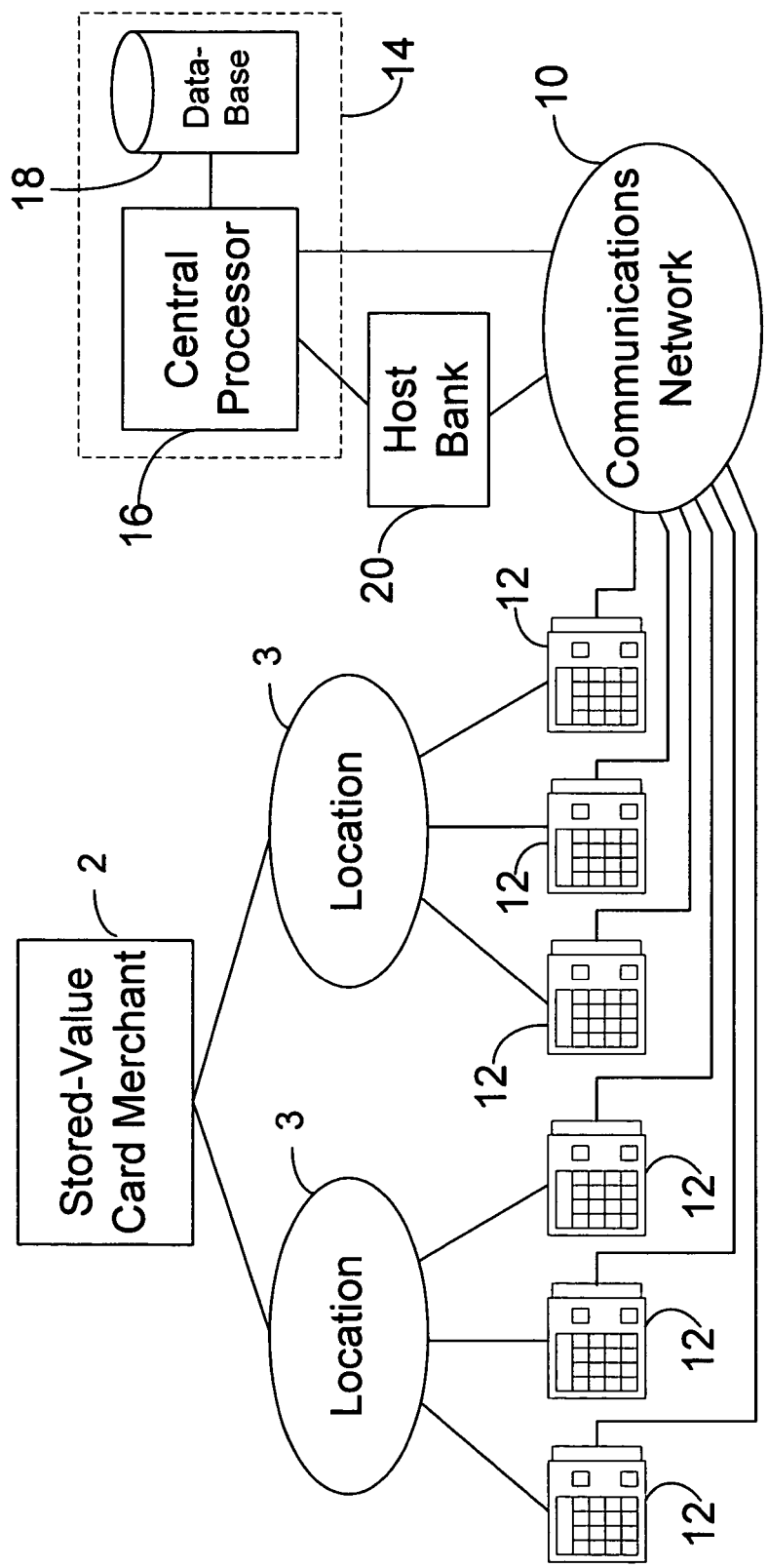

As shown in FIGS. 1 through 3, by way of a communications network 10, e.g., a public switched phone network, a wireless network, a dedicated data circuit such as a dedicated phone line, a credit or debit card network, the Internet, an intranet, etc., over which credit or debit card transactions are authorized or denied, and/or a point-of-sale terminal 12, e.g., a credit or debit card terminal, is used to send an authorization request to a stored-value card data management system 14, such as may be managed and operated by the assignee of the present invention. System 14 comprises a central processor 16 coupled to a database 18. The central processor 16 can be a host computer, a computer server, a computer system with software applications that receive transactions and process them according to preset rules, and any other computer system. The database 18 stores a plurality of records including stored-value card data for each stored-value card issued by the assignee of the present invention. The database can also store information identifying trusted sources for making stored-value card processing requests, such as requests to activate a stored-value card, and it can additionally store information identifying trusted communications networks for carrying or otherwise transmitting stored-value card processing requests. The identification information can be a telephone number, a static IP address, a password, a PIN, a merchant and/or terminal ID, or another unique code that can be associated with a particular user, merchant terminal, or communications network. The code may be chosen by a user at the terminal, randomly assigned, or selected from a list of codes by the central processor 16 and assigned to the terminal. It will be appreciated that in the case of a credit or debit card network, each stored-value card transaction request is expected to be handled, on average, within a certain time period such as approximately two seconds, or else one could lose its certification to use that network.

A respective requesting terminal, using the communications network 10, may send an authorization request through a suitable host bank 20 to the central processor. The authorization request could also be routed straight to the communications network 10 without passing through a host bank 20. FIGS. 1 through 3 show an exemplary link architecture between the communications network and the central processor, optionally through the host bank. That is, the link architecture allows communication of card related data from the merchant, to the communications network, which in one exemplary embodiment would be the Visa network for a Visa-routed transaction, to the host bank, and then to the central processor. It will be appreciated that other link architectures may be implemented, such as a host-to-host architectural connection. In this case, the communications network, such as a dedicated link or the internet, would be directly between a merchant's "host" system and a "host" system of the assignee of the present invention. Thus, the present invention is not limited to applications that require a host bank being that a host-to-host connection does not require any host bank or Visa network to transfer the card-related data to the central processor.

The authorization request may include information about the card swiped and the terminal used to swipe it, such as the electronic signature of that terminal, an IP address of the terminal, a phone number of the terminal, or a password provided by the terminal. It should be appreciated that other methods may be used to capture identification of the card besides swiping it; for instance, the information can be bar-code-scanned or entered manually at a keypad of a computer. Further, merchant terminals 12 may be any system that can transmit card identifier information over a communications network. Thus, merchant terminals 12 can be telephones, electronic cash registers, credit card machines, fax machines, computers, or other devices that can receive and transmit information.

Figure 4:
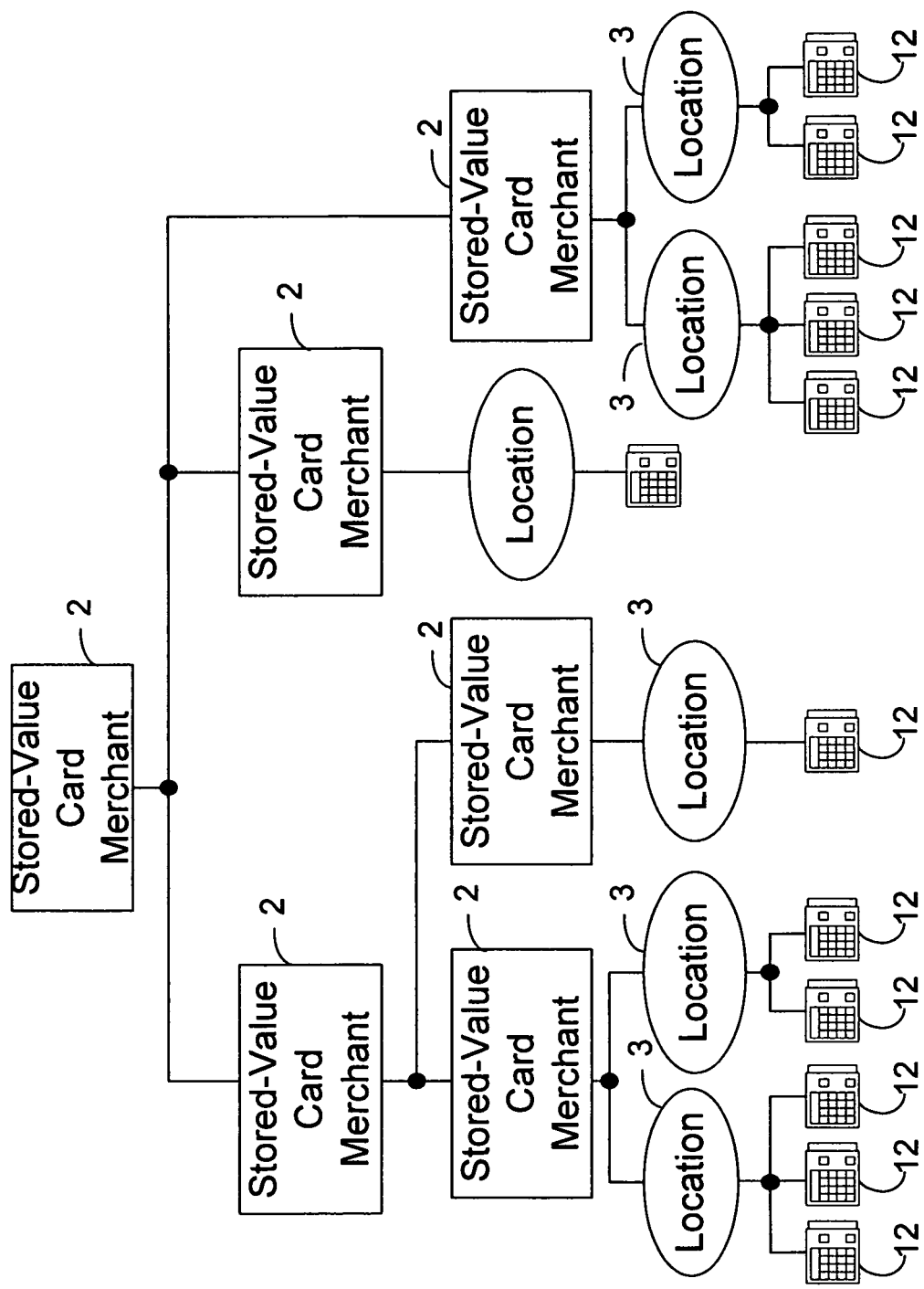

In another aspect of the system of the present invention, as shown in FIGS. 3 and 4, merchants and terminals can be divided into groups, membership of which varies depending on whether the context of the grouping is for the purpose of executing any specific action out of a set of actions that a respective user may execute, such as card activation, billing, commission payments, reporting, inventory management, etc. For example, terminal A from Merchant X may be in activation group I with terminal B from merchant Y, yet for billing purposes the two terminals may be in different groups. Also, Merchant X may be affiliated with terminals A, B, and C, and thus A, B, and C may be classified in the same group. Merchant X may also be grouped with Merchant Y and its terminals D, E, and F. In this way, terminals A-F may be in the same activation group for instance. The central processor can be preconfigured to determine whether a terminal is a trusted source based on whether the requester is in the same group as another terminal or merchant that is considered a trusted source.

Terminals in a given group can share a communications network. For instance, all the terminals in a given group may share a dedicated data line that connects them to the central processor. Requests can then be authorized when the central processor recognizes that the request was received via the dedicated data line and determines that the dedicated data line is a trusted source. Similarly, terminals in a given group can share a set of static IP addresses. In one embodiment, terminals are assigned static IP addresses when they log on to a server operated by an entity associated with the group. The server entity assigns a terminal an IP address selected from a defined set of IP addresses. Each of the IP addresses in the defined set is a trusted source and therefore has identifying information stored at the database.

Management and definition of these groups is the responsibility of a module configured to store in the database a list of trusted sources and trusted communications networks. The database can also include a table indicative of the set of actions that a respective user may execute from a respective terminal.

FIG. 4 shows an exemplary entity tree for a store-value card merchant 2. One or more merchant terminals 12 are located at a particular location 3 of a merchant, such as a particular store location. One or more locations 3 will be associated with a stored-value card merchant 2. Stored-value card merchants 2 may then be affiliated or otherwise associated with other stored-value card merchants 2, which may in turn have further affiliations with additional stored-value card merchants 2. By means of such a stored-value card merchant 2 network, a given merchant 2 may be associated with one or more locations 3 and terminals 12 through other merchants 2. For the sake of simplicity of illustration, blocks representing the stored-value card data management system and other associated blocks are not shown in the user entity trees shown in FIG. 4. It will be appreciated, however, that each of such user entity trees will be similarly interconnected to the stored-value card data management system 14 as exemplarily illustrated in FIGS. 1 through 3 or as further described herein.

Figure 5:
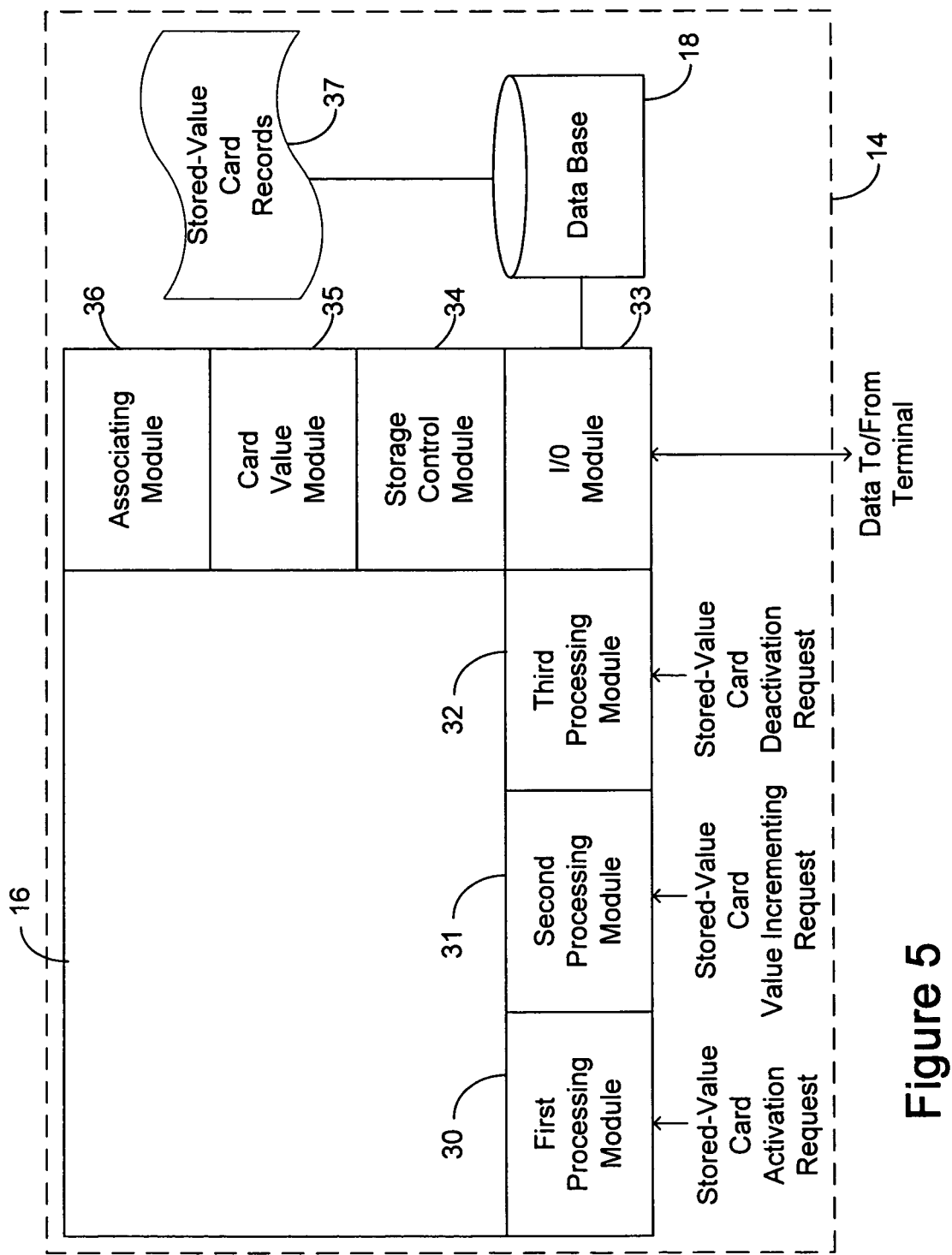
FIG. 5 is an exemplary modular architecture of the telecommunications card data management system shown in FIGS. 1-3.

FIG. 5 illustrates further details in connection with stored-value card data management system 16. As shown in FIG. 5, central processor 16 includes a storage control module 34 that allows for storing in database 18 a plurality of stored-value card records 37 comprising stored-value card data for each stored-value card, information identifying trusted sources for making stored-value card processing requests, and information identifying trusted communications networks for carrying or transmitting stored-value card processing requests. An associating module 36 allows for associating in each stored record respective identifiers that uniquely match a respective stored-value card and a respective terminal, or to match a card or terminal with other associated identifier information. A card value module 35 allows for defining in each stored record a parameter corresponding to the value of each respective stored-value card. That parameter could comprise a monetary amount corresponding to the value of each respective stored-value card or such parameter could comprise time units corresponding to the value of each respective stored-value card, or both. The card value module 35 may also allow for defining the parameters or methods by which a card's value can be changed.

Stored-value card data transmitted over the communications network may be received by input/output module 33 so that a first processing module 30 may process a request of stored-value card activation to the central processor from a respective requesting terminal. The central processor thus allows for accepting or declining an activation request, or other processing request, based on whether the request is from a trusted source or whether the request is transmitted over a trusted communications network.

The processing modules may also comprise modules for changing value, refreshing value, redeeming value, switching the value to another product, service, or currency, or otherwise changing the status of the stored-value card. Other processing modules can be considered. The refreshing module may change the value of the card back to the card's original value. Alternately, the refreshing module may add the card's original value to the current value of the card. For instance, via the refreshing module, a card with a current value of $15 and an original value of $20 could be increased to $20 (original value) or to $35 (current value plus original value), depending on the type of refreshing module. Generally speaking, values can be changed in predetermined increments (like $10) or any amount that is not predetermined. The redeeming module may refund to the customer the value of the card or a portion of the value of the card, or it may provide a monetary or other credit to the customer's account. It may also convert the value of the card into other goods or services offered by the merchant, merchant partner(s), or any other entity associated with the sale of the card, including the central processing station.

In one aspect of the present invention, the stored-value card may only be authorized if the request is made by any of a set of trusted sources, or made through a communication that travels over a trusted communications network. Through means described above, terminals that are trusted sources can be associated with respective identifiers by the associating module 36. However, trusted sources may not have any associated identifiers before a given transaction; instead, trusted sources may be verified to be trusted sources through means described herein.

As further shown in FIG. 5, data from the terminal is received at the I/O module 33. In one embodiment, information about the communications network used to make the request can be identified to the first processing module 30 based on the source of the request signal received at the I/O module 33. For instance, a dedicated data line may have a dedicated input at the I/O module 33, and requests made over the dedicated line will therefore be recognized to be transmitted by the dedicated data line because they are received at the I/O module 33 through the dedicated input. Alternately, a dedicated data line can carry or add identification information as an addition to the request communication. For instance, a dedicated data terminal can be preconfigured to transmit the series of numbers "1234567" before or after every merchant terminal communication in order to identify that the merchant terminal communication is being transmitted over the dedicated data line. In this embodiment, the central processor 16 can then determine that the request was made over a dedicated line by analyzing the information identifying the dedicated data line.

A first processing module 30 configured to process a request of stored-value card activation will analyze this data and send back either an authorization or a disapproval to the requesting terminal. For instance, a first processing module 30 can access the database through the I/O module 33 and compare the information of the terminal with a list of trusted sources stored in the database. If the information of the terminal matches a trusted source data entry in the database, the request will be authorized. If authorized, a database coupled to the central processor can be updated to reflect any authorization or disapproval. A similar process can be used when information is received over a trusted communications network. The first processing module 30 identifies the communications network used to make the request and grants the request if it determines that the communications network is a trusted one. The first processing module 30 can make this determination by itself or by comparing identification information of the communications network to a list of trusted communications networks stored at the database 18.

As further shown in FIG. 5, a second processing module 31 allows for processing a request for changing the value associated with a respective stored-value card. The request is transmitted over the communications network to the central processor from a respective requesting terminal. The central processor thus further allows for accepting or declining the change value request based on whether the respective identifiers stored in the record for the stored-value card whose associated value is to be changed match the identifiers actually transmitted by the requesting terminal for that stored-value card and terminal. A third processing module 32 allows for processing a request of stored-value card deactivation to the central processor from a respective requesting terminal. In this case, the central processor is configured to accept or decline the deactivation request based on whether the request is from a trusted source or whether the request is transmitted over a trusted communications network.

Figure 6:
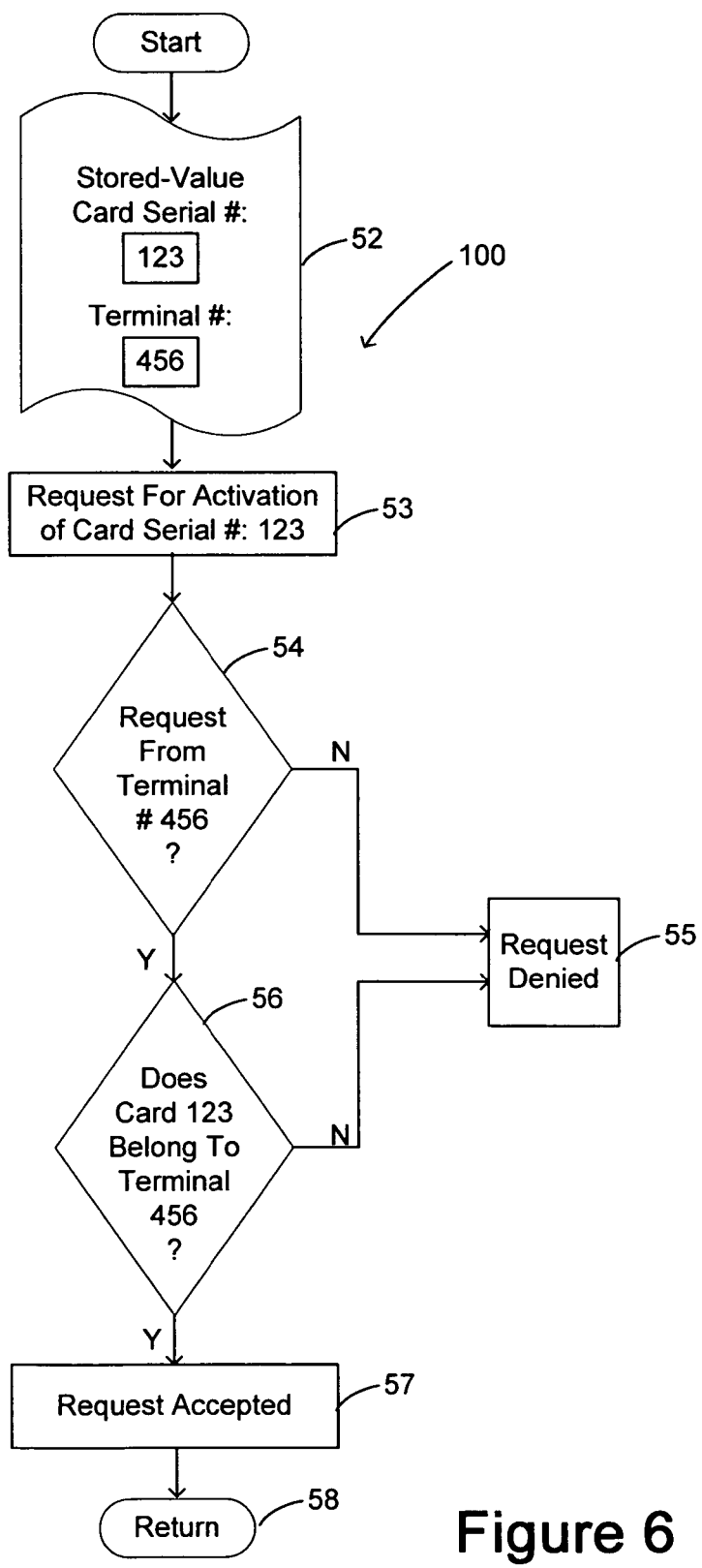
FIG. 6 is an exemplary flow chart illustrating one aspect of the present invention as may be implemented by the system of FIG. 5.

FIG. 6 illustrates an exemplary flow chart 100 such as may be implemented by a stored-value card data management system embodying one aspect of the present invention. The method described in this flowchart is preferably used when a requesting terminal has already been assigned an associated identifier, such as the number 456 as used in the following example. As shown in step 52, a stored-value card serial No. 123 is associated with terminal No. 456. In step 53, a request for activation of stored-value card serial No. 123 is processed. In one embodiment, it may be processed as follows. A verification module would allow for determining whether that request came from terminal No. 456, as in step 54. Then the verification module determines whether card 123 has been assigned to the location containing No. 456, as shown in step 55. If the verification module determines that in fact such request was generated from terminal No. 456, and card 123 has been assigned to the location containing terminal 456, then the central processor would generate a message indicating that the request has been accepted, as in step 57. If the verification module determines that the requesting terminal is other than No. 456, or if the card is not assigned to the location, then a message would be issued declining the transaction, as shown in step 56.

Figure 7:
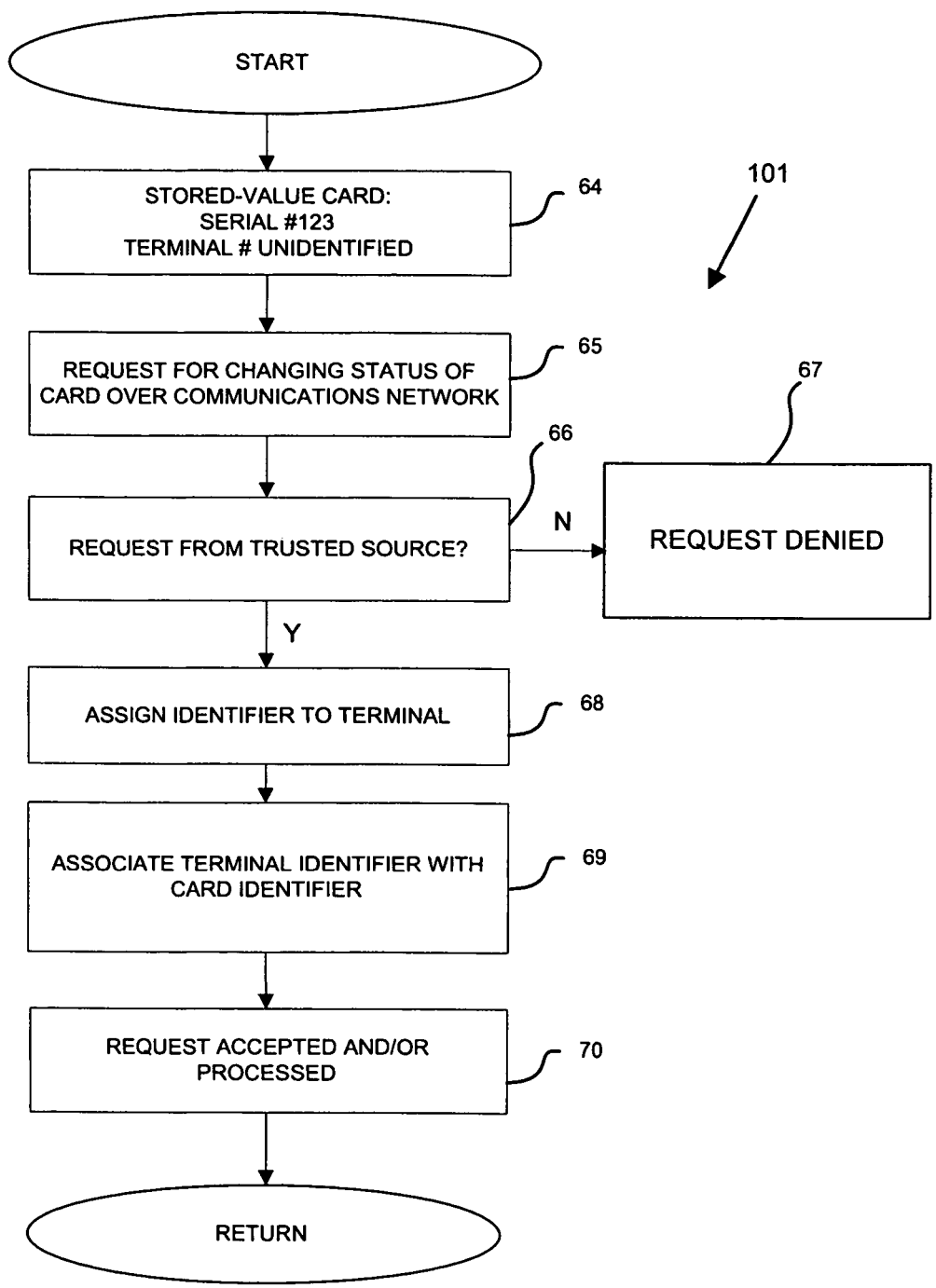
FIG. 7 is an exemplary flow chart illustrating another aspect of the present invention as may be implemented by the system of FIG. 4.

FIG. 7 illustrates an exemplary flow chart 101 such as may be implemented by a stored-value card data management system embodying one aspect of the present invention. As shown in steps 64 and 65 of FIG. 7, a terminal with no associated identifier makes a request for changing the status of a stored-value card with exemplary serial No. 123, which serial number has not been associated with any terminal. The request may then be processed as follows. In step 66, a verification and/or authorization module would allow for determining whether the request originated from a trusted source, such as a source identified in the central processor's database. The operation of the verification module depends on the type of communications network on which the request was made, as shown further in FIG. 8. If the request is not from a trusted source, then the request is denied or otherwise held or halted in step 67. Appropriate action may then be taken, such as attempting to identify or locate the requester or merchant terminal, or invalidating the stored-value card with the identified serial number.

If the request is determined to be from a trusted source, then the request will continue to be processed. As shown in step 68, the unidentified merchant terminal may then be assigned an identifier, and the identifier may then be associated with the stored-value card identifier as in step 69. The request is then processed and/or accepted in step 70.

Figure 8A:
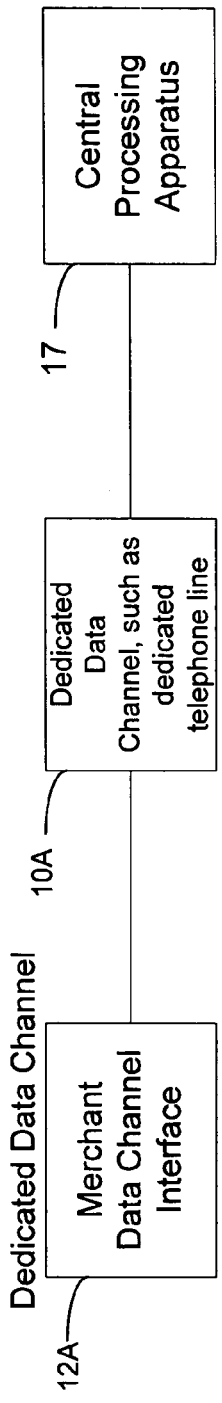
FIGS. 8A, 8B, and 8C are block diagrams illustrating different types of communications networks.
Figure 8B:
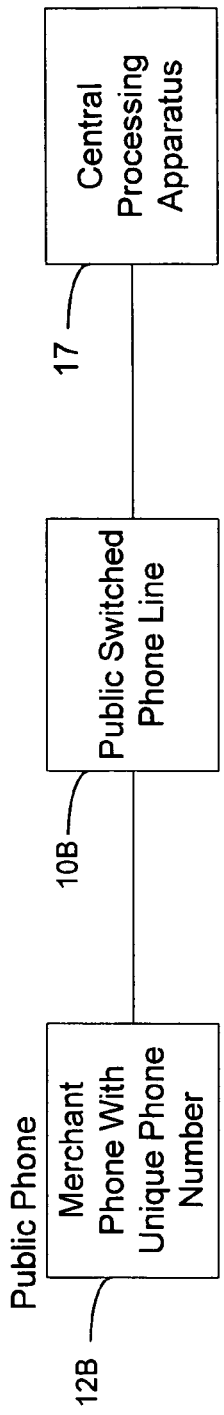
Figure 8C:
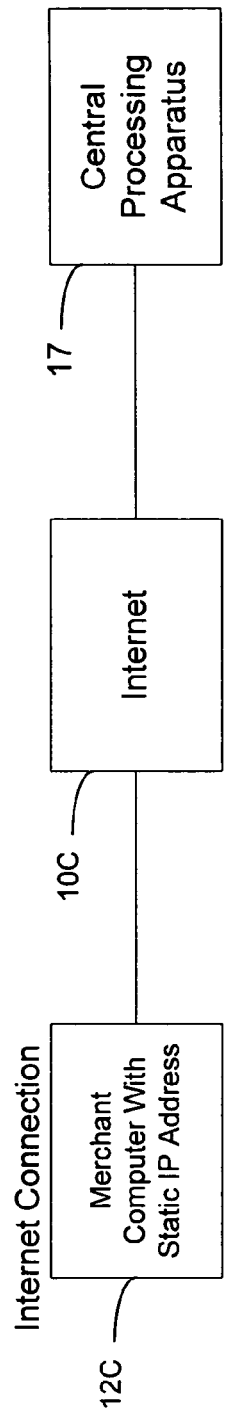

FIGS. 8A, 8B and 8C illustrate various exemplary communications networks, which can be used to verify that a request is made from a trusted source. In FIG. 8A, a merchant data channel interface 12A communicates with a central processing apparatus 17, which can be a central processor, host bank, or other centralized entity, via a dedicated data channel between a merchant and the central processing apparatus, such as dedicated telephone line 10A. Because the communications network is a dedicated data channel, only the merchant and the central processing apparatus have access to the communications network, in addition to those entities that may be granted access to the communications network by the merchant and central processing apparatus. Thus, the central processor authorizes all requests made over the dedicated data channel because such requests are deemed to be from a terminal affiliated with the trusted merchant who has access to the dedicated line. In this embodiment, the central processing apparatus determines that the request is from a trusted source if the request is received over a dedicated data source.

It may be appreciated that the central processing unit 16 can then add the requestor to the list of trusted sources by storing information identifying the trusted source in the database 18. This could be accomplished by assigning an identifier, such as a password or code, to the requester and storing said identifying information in the database 18 as a trusted source. Then, if the requestor later makes a request over a communications network that is not considered a trusted communications network, like a public switched telephone network, then the requestor can identify itself over the network while making a request. The central processor 16 can then determine that the requestor is a trusted source and accordingly grant the request. That requester may then be classified as a trusted source for subsequent transactions so that future requests will be automatically granted.

One way the processor can determine that future requests from a particular trusted requestor are indeed from the trusted requestor is to assign identifying information to the requestor at the time the requestor is first determined to be a trusted source, such as when the requester makes a request over a trusted communications network like a dedicated data line. In this embodiment, the processor 16 communicates the identifying information to the requestor over the communications network 10 and also stores the information in its database 18. When the trusted source makes subsequent requests over any communications network, it includes the identifying information in its request to the processor 16. The processor receives the request with the accompanying identifying information. It can then compare the identifying information to the records stored in the database 18. By comparing the identifying information to the identifying information stored in the database 18, the processor can determine whether the merchant is a trusted source.

In one exemplary embodiment of FIG. 8A, ABC Stores, Inc. ("ABC"), a hypothetical trusted source, has a dedicated data line connecting one or more of its merchant terminals to a central processing apparatus. ABC opens a new ABC store with new merchant terminals that are as yet unknown to the central processing apparatus. In particular, the ABC store has been assigned no identifying information, and the database does not contain any information specifically identifying this particular ABC store. The unidentified terminal of the new store makes a request over the dedicated line. Although the central processing apparatus has never verified the identity of the new ABC terminals, the central processing apparatus will process and grant the request because it treats all requests made over ABC's dedicated line as a request made by a trusted source. In effect, any requester on a dedicated line is automatically a trusted source. Other embodiments can be considered.

However, in another exemplary embodiment, the new ABC store terminal must first obtain an identifier before its request can be granted. Upon receiving the request and determining that the request was received over a dedicated line that is a trusted source, the central processing apparatus assigns an identifier to the requesting terminal and associates the identifier with the stored-value card's identifier. Then the request can be processed and the card can be activated. Other embodiments can be considered.

In another embodiment, the central processing apparatus sets up an identifier before the request. For instance, ABC notifies the central processor that a new ABC store is opening soon, and an identifier is reserved for that new ABC store in the event that a terminal at the new ABC store makes a request. Then when the requesting entity makes a request, the requesting identity is already identified. In this instance, the request could be processed without the step of assigning an identifier to the new terminal. However, additional identification could be added and/or assigned at the time of the first request as needed. For instance, the new store could be issued a default password, and then the new store could request and/or obtain a new password when it makes its first request to the central processor.

In FIG. 8B, an unidentified merchant with a unique phone number 12B communicates a request for a stored-value card to a central processing apparatus 17, such as a central processor 16, over a public switched phone line 10B. Such communication may use a modem, an interactive voice response system (IVR), or any other means of communicating over a public switched telephone network. The central processing apparatus can identify the unique phone number of the merchant based on the DNIS and ANI numbers that are carried on regular phone calls. Similarly, the "caller ID" feature can be used to identify the phone number of entities contacting a remote entity over a public switched phone line. The central processing apparatus can then determine if the identified phone number is a trusted source by comparing the merchant terminal's phone number with the phone numbers of the trusted sources stored in the database 18. If the central processing apparatus 17 determines that the phone number does belong to a trusted source, then the central processing apparatus 17 will process and grant the request. Otherwise, the request may be rejected.

Other methods of identifying merchant terminals can be considered.

In the embodiment of FIG. 8B, the merchant 12B communicates a request for a stored-value card to a central apparatus over a public switched phone line 10B. The merchant 12B enters a password or other identifying information over the phone line, such as by transmitting a series of tones during a phone call with a central processing apparatus 17. Other methods of communicating identification information over a phone line can be considered, such as by fax or internet communication. The central processing apparatus 17 then compares the identifying information of the merchant 12B with identifying information of the trusted sources listed in the database 18. Based on the comparison, the central processing apparatus determines whether the merchant 12B is a trusted source. If the central processing apparatus 17 determines that the merchant 12B is a trusted source, then the central processing apparatus 17 will process and grant the request. Otherwise, the request may be rejected. Other embodiments can be considered.

In FIG. 8C, a merchant computer terminal with a static IP (internet protocol) address submits a request by communicating with the central processing apparatus 17 via the internet 10C. Through methods well known in the art, a merchant computer terminal can connect to the internet through a modem, LAN, WAN, cable connection, or other internet connection. The merchant terminal is assigned a static IP address by its internet service provider, which could be a merchant, merchant group, or another service provider. The merchant terminal 12C communicates a request to the central processing apparatus 17. Through methods well known in the art, the central processing apparatus 17 determines the static IP address of the terminal 12C based on the received electronic communication. By comparing the static IP address with the static IP addresses of trusted sources, the central processing apparatus 17 can determine if the terminal 12C is a trusted source. If it is, then in a method similar to that described above for FIGS. 8A and 8B, the central processing apparatus 17 processes the request and activates the card. If it is not determined to be a trusted source, then the request may be rejected.

In one embodiment, the request is accompanied by information identifying the merchant computer terminal 12C. For instance, the merchant terminal 12C may enter a password, which is transmitted from the merchant computer 12C with a static IP address to the central processing apparatus 17. Through methods described above, the central processing apparatus 17 can then determine whether the merchant terminal 12C is a trusted source based on the password. If the merchant computer 12C is a trusted source, then the IP address may become a trusted source, such as by storing the IP address in the list of trusted sources in the database. However, because in some cases a given merchant computer 12C may have a different IP address the next time it logs onto the internet, the central processing apparatus 17 may purge such static IP addresses unless the merchant computer 12C is otherwise known to have a permanent static IP address.

In another embodiment, the central processing apparatus 17 does not store the IP address as a trusted source. In this embodiment, verification of the identification at the beginning of the request is sufficient to authorize the transaction, and no further authorization steps are necessary. Other embodiments can be considered.

In one embodiment, due to an arrangement with the merchant terminal's 12C internet service provider, the merchant has the same static IP address for every internet session. The central processing apparatus 17 stores this address in the database as an identifier for a trusted source. The merchant 12C makes a request over the internet from the same static IP address, and the central processing apparatus 17 processes and grants such request after it identifies the request as originating from a trusted static IP address, such as a trusted static IP address of a merchant terminal 12C.

In another embodiment, the merchant 12C will be assigned one of a set of static IP addresses, each of which are trusted sources. The merchant 12C can then make requests that will be processed, as described above, because it will always make such request using a static IP address that is a trusted source.

Figure 9:
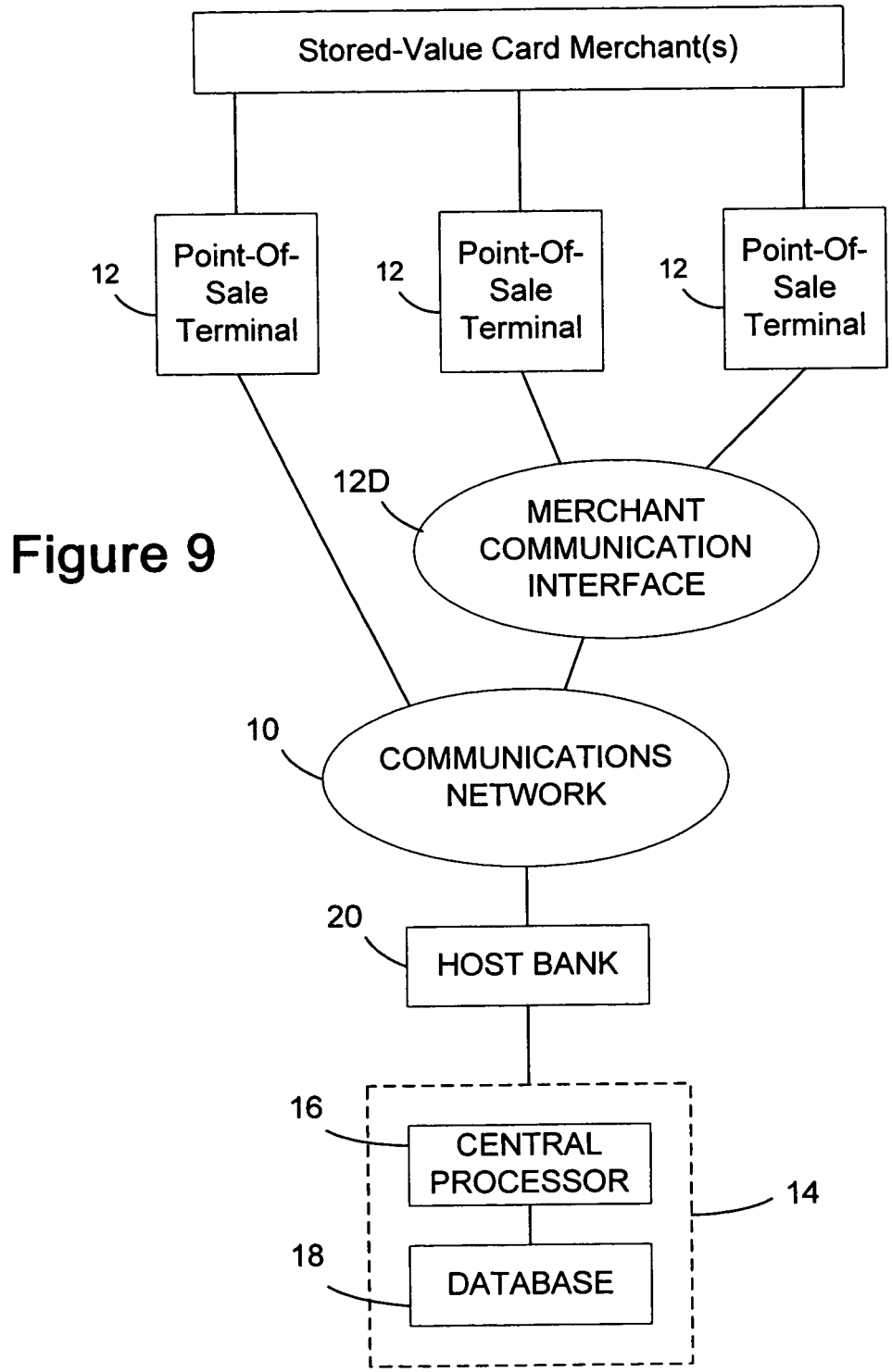
FIG. 9 is a block diagram illustrating an exemplary user tree and communication path of requests for stored-value cards between terminals and the central processor.

FIG. 9 shows an exemplary user tree and communication path between a merchant terminal and the host bank and central processor. As illustrated in FIG. 9, point-of-sale terminals 12 can communicate with the host bank and central processor by interfacing first with a merchant communication interface 12D. The merchant communication interface 12D can be connected to any number of point-of-sale terminals 12, which in turn can be connected to any number of merchants. The merchant communication interface 12D may itself be a point-of-sale terminal 12. For instance, the point-of-sale terminals 12 and the merchant communication interface 12D may be computers connected on a LAN (local area network) or a WAN (wide area network). Communications from multiple terminals 12 may first pass through a merchant network hub before the communications leave the merchant and pass through other communications networks such as the internet, a dedicated line, or an outside phone system.

Alternately, in FIG. 9, as in FIGS. 1 and 2, the point-of-sale terminal can interface directly with the communications network.

It must be noted that in the above FIGS. 7-9, the requesting terminal or other requesting entity may not have a prior identifier associated with it before the first request. Thus, to this extent, the requesting entity is not identified to the central processor and host bank. However, other information may already be known about the requesting entity. In the ABC example described for FIG. 8A above, the data management system 14 could already determine that the requestor was an ABC entity, such as an ABC store terminal, because only ABC entities have access to the dedicated line. It should be appreciated that the step of associating an identifier with a previously unidentified terminal can be removed entirely. It should also be appreciated that these methods apply equally to the request/activation process over phone lines and the internet.

Those skilled in the art may also appreciate that the service provider and/or card value can be chosen by the user upon purchase or activation, or at any time chosen by the user. When the requesting entity such as a merchant terminal requests a card or PIN, the requesting entity asks for a specific dollar, minute, or other value for the card. The central processor could then simply alter the existing record for the card, if one exists, in order to reflect a higher or lower dollar amount as requested by the user over the communications network. E.g., a customer could request that a given amount, such as $50, be assigned to a particular card. During the process of authenticating the transaction, the central processor could edit its records to reflect the new card value. Thus, card values can be variable. This is true whether the card values are initially fixed, or whether their value is unidentified and unassigned until the point of sale. Similarly, in the case of telecommunications service or any other kind of user services applicable to stored-value cards, the user may select the service provider at the point of sale, or later if the card must be redeemed by the user at a later date. At any point when the user interacts with the central processor, that processor has the ability to amend and alter the identifiers associated with a card as well as any other associated information, such as the card's current value or face value.

The stored-value card data management system in one exemplary embodiment enables a web-based, ID and password protected application available to anyone with internet access and the appropriate ID and Password. As described-above, the system comprises respective modules for card generation, merchant establishment, location establishment, terminal setup, and inventory assignment to merchants and/or locations. The system may also be used for other card-related actions, such as web-based activation, deactivation, value change, refresh, and value redemption.

The present invention can be embodied in the form of computer-implemented processes and apparatus for practicing the processes described above. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

Figure 10:
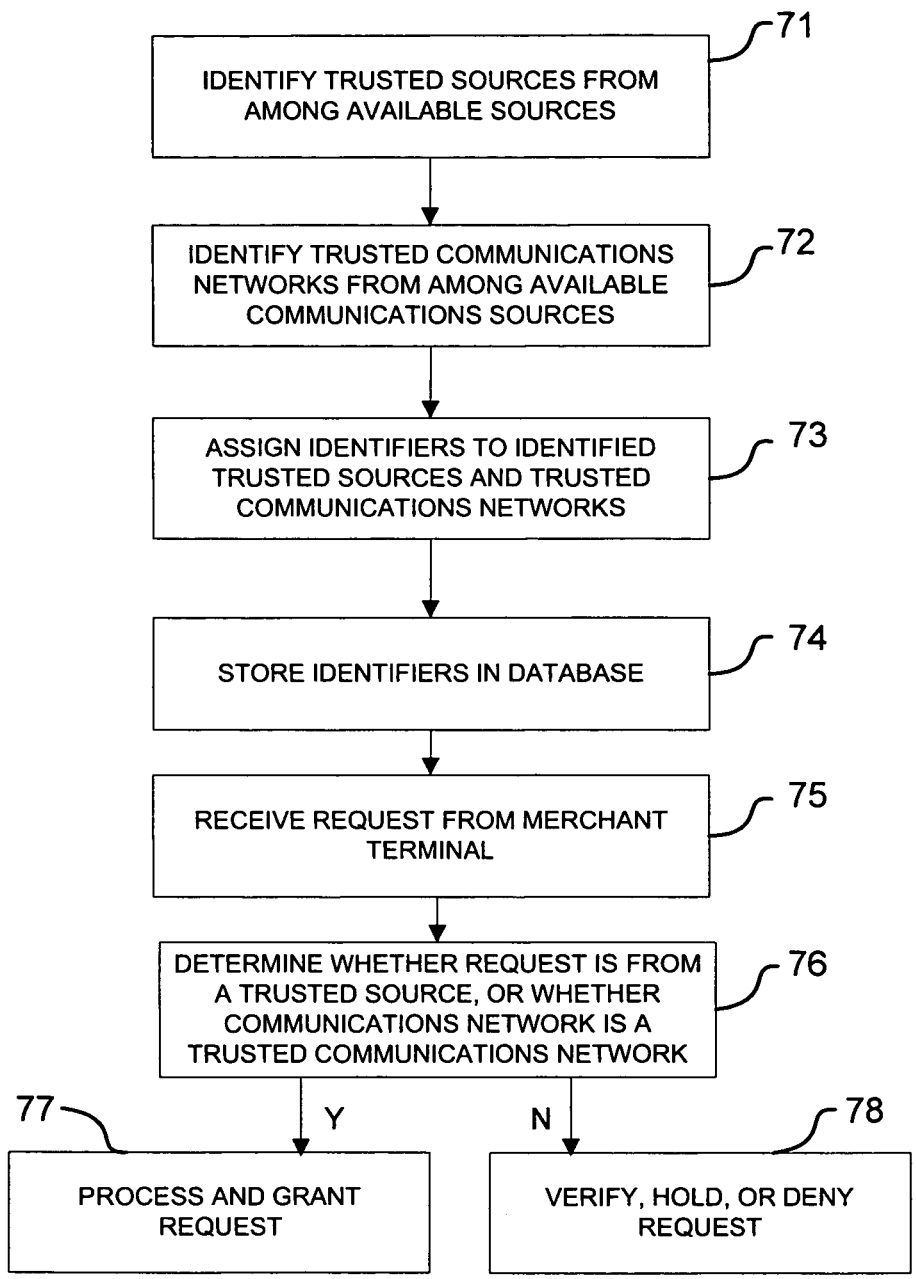
FIG. 10 is an exemplary flow chart illustrating another aspect of the present invention as may be implemented by the system of FIG. 3.

FIG. 10 is an exemplary flow chart illustrating another aspect of the present invention as may be implemented by the system of FIG. 3. In step 71, a person(s), processor, computer, or other entity identifies one or more trusted sources that are authorized to make stored-value card requests. The trusted sources may include, in a preferred embodiment, a list of merchants authorized to request PINs. Similarly, in step 72, an entity identifies one or more trusted communications networks that are known to carry or transmit only valid stored-value card requests. The trusted communications networks may include, in a preferred embodiment, a list identifying the various dedicated data lines connecting authorized merchants or merchant terminals to the central processor. Steps 71 and 72 are described separately, but it should be understood that these two steps need not be done in order. Further, the system should be constantly updating its list of trusted sources as new sources and networks are determined to be trusted sources.

In step 73, an entity such as the central processor 16 assigns identification information to the identified trusted sources and identified trusted communications networks. The identification information may be a merchant terminal ID number or other identifier, such as a static IP address or phone number. For communications networks, the identifier may be an internal code used to identify a particular communications network from another network. For instance, different communications networks that have different inputs into the processor system can be identified by assigning different numbers to the different inputs. In step 74, the identifiers are stored in a database 18. It should be noted that communications networks may not have identifiers in the traditional sense of the word, and such identifiers may not be amenable to storing in a database. For instance, trusted communications networks may be identified by virtue of having a different connection or input to the processor than communications networks that are not trusted, and thus they can be identified by virtue of having the separate connection.

In step 75, a request is received from a merchant terminal. Here, merchant terminal can mean any entity that submits a request to the processor. In step 76, the processor determines whether the request is from a trusted source, i.e., whether the requesting merchant terminal is a trusted source. The processor can make its determination based on information identifying the requester. For instance, requestors can be verified to be trusted sources by correctly entering a password over a phone network. Phone requestors can also be verified by determining that the requestor's phone number is listed in the database as a trusted source. Requestors who request over the internet can be verified by having made the request from a trusted static IP address, or from a static IP address known to have previously submitted a correct password. The processor verifies the sources by comparing their identifier information such as passwords with the identification information stored in the database 18.

The processor also determines whether the communications network carrying the request is a trusted communications network. If the request carries an identifier that identifies the communications network, the processor can compare the identifier with the trusted identifiers in the database. This verification process can also be done by simply determining how the request arrived at the processor. For instance, if input #3 is a trusted source and the processor determines that the request arrived via input #3, then the processor can determine that the request was carried by a trusted source. Other methods can be used, which are well-known in the art.

If the request is determined to be from either a trusted source or a trusted communications network, then the request is processed and granted in step 77. If the request is not determined to be from a trusted source or trusted communications network, then in step 78 the request may be denied, other means of verification can be pursued, or the request can be put into a hold category.

Other embodiments can be considered. For instance, for many of the embodiments described above, the request can be any request, including a request for activation, deactivation, value change, or another request.

It will be understood that the specific embodiment of the invention shown and described herein is exemplary only. Numerous variations, changes, substitutions and equivalents will now occur to those skilled in the art without departing from the spirit and scope of the present invention. Accordingly, it is intended that all subject matter described herein and shown in the accompanying drawings be regarded as illustrative only and not in a limiting sense and that the scope of the invention be solely determined by the appended claims.

What is claimed is:

1. A computerized method for securely authorizing and transacting specific processing requests for stored-value cards from an originating merchant location over an originating communications network, the method comprising:

storing in a database coupled to a central processor a plurality of records comprising information identifying specific merchant locations, if any, and information identifying specific communications networks for carrying or transmitting stored value card processing requests, if any, that are authorized to transact specific processing requests, each of the specific merchant locations and specific communications networks identified by an identifier;

receiving at the central processor a specific processing request for a stored value card, along with the identifier of the originating merchant location or the originating communication network;

determining at the central processor whether the received identifier of the originating merchant location or the originating communication network is stored in the database as a trusted source for making the specific processing request;

responsive to a determination that the received identifier is associated with a trusted merchant location that is stored in the database as a trusted source for making the specific processing request, performing the specific processing request;

responsive to a determination that the received identifier is associated with a trusted communication network for making the specific processing request for the stored value card:

performing the specific processing request; and capturing an identifier of the originating merchant location from which the specific processing request was sent over the originating communications network, deeming that the originating merchant location is a trusted source based upon its use of a trusted communications network, and storing the captured identifier of the originating merchant location in the database as a trusted merchant location for future processing requests, if not already stored in the database.

2. The computerized method of claim 1, wherein said stored-value card is selected from the group consisting of: a gift card, a prepaid gas card, a prepaid grocery card, a prepaid entertainment card, a card used for downloading ring tones, a card used for downloading software, a card used for downloading music files and a customer rewards card.

3. The computerized method of claim 1, wherein the originating communications network is a dedicated data circuit.

4. The computerized method of claim 1, wherein the specific processing request is a request to activate, deactivate, reload, refresh, redeem, or refund the stored value card.

5. The computerized method of claim 4, wherein the originating merchant location is identified by a static IP address, and the determining step is based on whether the static IP address is recorded in the database as a trusted source of processing requests.

6. The computerized method of claim 4 wherein the originating merchant location is identified by a static IP address, the originating merchant location enters a password to access a network wherein the password is based on or identical to the static IP address, the originating merchant location communicates with the central processor using the static IP address, and the determining step is based on whether the static IP address is recorded in the database as a trusted source of processing requests.

7. The computerized method of claim 4, wherein the request to activate, deactivate, reload, refresh, or refund a stored value card is associated with a respective stored value card, the request being transmitted to the central processor from an originating merchant location, the central processor configured to accept the request to activate, deactivate, reload, refresh, or refund a stored value card based on whether the respective identifiers stored in the record for the stored-value card match identifiers actually transmitted by the originating merchant location for that stored-value card.

8. The computerized method of claim 1 wherein the request is transmitted over a public switched telephone network and the merchant location is determined to be a trusted source by performing a step selected from the group consisting of: identifying the telephone number used by the merchant location, and communicating an acceptable password or merchant location identifier to the central processor.

9. The computerized method of claim 1 further comprising selectively encoding the specific processing requests based on a table of predefined codes stored in the database, the predefined codes being associated with respective user groups or locations.

10. The computerized method of claim 1, wherein said stored-value card is a card for a purpose, selected from the group consisting of: downloading music files, downloading games, enabling long distance telephone communication, enables wireless communication, enables paging services, enables internet communication services, and enables wireless web access.

11. The computerized method of claim 1, further comprising:

receiving at the central processor a request from a customer to add stored value to a customer account, the request including a first identifier, wherein the first identifier and the stored value are associated with the stored-value card, and wherein the customer account is managed by a provider; and providing from the central processor a provider identifier associated with the provider to the customer, wherein the provider identifier is effective to add the associated stored value to the customer account.

12. The computerized method of claim 11, further comprising:

establishing at the central processor communication between the customer and a provider communications system managed by the provider.

13. The computerized method of claim 12, further comprising:

adding the associated stored value to the customer's account after receiving the provider identifier from the customer.

14. A system for authorizing and transacting specific processing requests for stored-value cards from an originating merchant location over an originating communications network, comprising:

a database;

a storage module connected to the database and configured to store in the database a plurality of records comprising information identifying specific merchant locations, if any, and information identifying specific communications networks for carrying or transmitting stored value card processing requests, if any, that are authorized to transact specific processing requests for a stored value card, each of the specific merchant locations and specific communications networks associated with an identifier;

a processing module in selectable communication with the database and storage module, the processing module configured to:

process a request from the originating merchant location to the processing module the request comprising an identifier of the originating merchant location or the originating communication network, the processing module configured to perform the request based on whether the received identifier is stored in the database as a trusted source for making the specific processing request for the stored value card; and responsive to a determination that the received identifier is associated with a trusted merchant location that is stored in the database as a trusted source for making the specific processing request for the stored value card, performing the specific processing request for the stored value card;

responsive to a determination that the received identifier is associated with a trusted communication network for making the specific processing request for the stored value card:

performing the specific processing request for the stored value card; and capturing an identifier of the originating merchant location from which the specific processing request was sent over the originating communications network, deeming that the originating merchant location is a trusted source based upon its use of a trusted communications network, and storing the captured identifier of the originating merchant location in the database as a trusted merchant location for future stored-value card processing requests, if not already stored in the database.

15. The system of claim 14, wherein the processing module is capable of performing a specific processing request selected from the group consisting of: a request to change a status of the stored-value card, activating the stored-value card, deactivating the stored-value card, changing the value of the stored-value card, refreshing the stored-value card, and redeeming the value of the stored-value card.

16. The system of claim 14 wherein the originating communications network is a dedicated data circuit.

17. The system of claim 14 wherein the originating network is the Internet.

18. The system of claim 17, wherein the originating merchant location is identified by a static IP address, and the processing module is capable of determining whether the static IP address is recorded in the database as a trusted source of processing requests.

19. The system of claim 17 wherein the originating merchant location is identified by a static IP address and the originating merchant location is capable of communicating with the processing module using the static IP address to determine whether the static IP address is recorded in the database as a trusted source of processing requests.

20. The system of claim 14 wherein the processing module receives the request over a public switched telephone network and the processing module is capable of determining whether the merchant location is a trusted source of processing requests.

\* \* \* \* \*